(12) United States Patent
Gowda et al.

(10) Patent No.: US 12,169,566 B2
(45) Date of Patent: Dec. 17, 2024

(54) UNTRUSTED ORCHESTRATOR FUNCTION SUBSYSTEM INVENTORY AND VERIFICATION SYSTEM

(71) Applicant: Dell Products L.P., Round Rock, TX (US)

(72) Inventors: Srinivas Giri Raju Gowda, Santa Clara, CA (US); Syama Poluri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 290 days.

(21) Appl. No.: 17/833,276

(22) Filed: Jun. 6, 2022

(65) Prior Publication Data

US 2023/0394154 A1    Dec. 7, 2023

(51) Int. Cl.
| | | |
|---|---|---|
| *G06F 21/57* | (2013.01) | |
| *G06F 9/4401* | (2018.01) | |
| *G06F 13/10* | (2006.01) | |
| *G06F 21/00* | (2013.01) | |
| *G06F 21/44* | (2013.01) | |
| *G06F 21/50* | (2013.01) | |

(52) U.S. Cl.
CPC ............ *G06F 21/572* (2013.01); *G06F 21/50* (2013.01); *G06F 9/4411* (2013.01); *G06F 13/10* (2013.01); *G06F 21/00* (2013.01); *G06F 21/44* (2013.01); *G06F 21/575* (2013.01); *G06F 2221/033* (2013.01)

(58) Field of Classification Search
CPC ...... G06F 21/572; G06F 21/575; G06F 21/44; G06F 21/00; G06F 9/4411; G06F 13/10; G06F 21/50; G06F 2221/033
USPC ................................................. 713/1, 2, 100
See application file for complete search history.

(56) References Cited

U.S. PATENT DOCUMENTS

| | | | |
|---|---|---|---|
| 9,208,112 B1 * | 12/2015 | Xie ......................... G06F 13/24 |
| 10,599,848 B1 * | 3/2020 | Yau ........................ G06F 9/4401 |
| 11,075,952 B2 | 7/2021 | Ramachandran et al. |
| 2008/0209544 A1 * | 8/2008 | Kempka ................ G06F 21/445 |
| | | | 726/17 |
| 2009/0083849 A1 * | 3/2009 | Wong ...................... G06F 21/31 |
| | | | 726/18 |
| 2015/0363590 A1 * | 12/2015 | Patel ..................... H04L 63/102 |
| | | | 726/17 |
| 2018/0300469 A1 * | 10/2018 | Sarfraz ................. G06F 21/554 |

(Continued)

*Primary Examiner* — Ji H Bae
(74) *Attorney, Agent, or Firm* — Joseph Mencher

(57) ABSTRACT

An untrusted orchestrator function subsystem inventory and verification system includes an untrusted orchestrator device, an operating system, a BIOS, and a management device. In response to presentation by the untrusted orchestrator device of a function subsystem to the operating system during runtime, the operating system generates a function subsystem detection alert that identifies the function subsystem. In response to the function subsystem detection alert, the BIOS generates and transmits a BIOS inventory update. The management device receives the BIOS inventory update, and determines whether the operating system is authorized to use the function subsystem at least in part based on the BIOS inventory update. If so, the management device allows the operating system to utilize the function subsystem while, if not, the management device prevents the operating system from utilizing the function subsystem.

20 Claims, 17 Drawing Sheets

(56) References Cited

U.S. PATENT DOCUMENTS

2019/0089706 A1* 3/2019 Rose ............... G06F 21/44
2020/0356357 A1* 11/2020 Narasimhan ......... G06F 15/167
2022/0132604 A1* 4/2022 Hughes ............... H04W 48/16

* cited by examiner

UNTRUSTED ORCHESTRATOR FUNCTION SUBSYSTEM INVENTORY AND VERIFICATION SYSTEM

BACKGROUND

The present disclosure relates generally to information handling systems, and more particularly to inventorying and verifying function subsystems presented to an information handlings system by an untrusted orchestrator.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, may be configured to access physical function subsystems and virtual function subsystems ("function subsystems" below) both in that computing device and coupled to that computing device via a network, in order to expand the functionality of that computing device. In some scenarios, computing device manufacturers may manufacture such computing devices with untrusted orchestrator devices from orchestrator device vendors, with those untrusted orchestrator devices operating to provide function subsystems to an Operating System (OS) in that computing device for use in providing any of a variety of functionality. As will be appreciated by one of skill in the art in possession of the present disclosure, such untrusted orchestrator devices may be "untrusted" based on their having been manufactured by an entity other than the computing device manufacturer that provides the computing device in which they are located, based on a lack of control over the untrusted orchestrator device by the computing device manufacturer that provides the computing device in which they are located, and/or due to any other untrusted device factors that would be apparent to one of skill in the art in possession of the present disclosure. In many situations, users of such computing devices may purchase license(s) from the computing device manufacturer that allow access to particular function subsystems and/or types of function subsystems for use with the computing device, and the use of untrusted orchestrator device in such situations can raise issues.

For example, a management device is often also provided in the computing device discussed above in order to operate as a "root-of-trust" for the computing device, as well as to manage the function subsystems that are provided to the operating system in order to, for example, ensure that only licensed function subsystems or licensed types of function subsystems are provided to the operating system by the untrusted orchestrator device. However, the management device will not have direct and reliable visibility into the function subsystems provided to the operating system by the untrusted orchestrator device, as any inventory of operating-system-provided function subsystems provided by the untrusted orchestrator device to the management device cannot be trusted for the same reasons that the untrusted orchestrator device cannot be trusted. Furthermore, the management capabilities of the management device with the untrusted orchestrator device do not extend to the provisioning of function subsystems by the untrusted orchestrator device to the operating system, and conventional management devices have no capability to verify or manage function subsystems provided to the operating system by untrusted orchestrator devices. As such, at any time the untrusted orchestrator device is capable of changing the function subsystems provided to the OS (e.g., via a device presentation layer), and thus a malicious untrusted orchestrator device (or an untrusted orchestrator device under malicious control) may provide unauthorized function subsystems to the operating system without any knowledge of the management device.

Accordingly, it would be desirable to provide an untrusted orchestrator function inventory and verification system that addresses the issues discussed above.

SUMMARY

According to one embodiment, an Information Handling System (IHS) includes an Information Handling System (IHS) chassis; an untrusted orchestrator device that is included in the IHS chassis; a processing system that is included in the IHS chassis; a memory system that is included in the IHS chassis, that is coupled to the processing system, and that includes instructions that, when executed by the processing system, cause the processing system to provide an operating system that, in response to presentation by the untrusted orchestrator device of a function subsystem to the operating system during runtime, generates a function subsystem detection alert that identifies the function subsystem; a Basic Input/Output System (BIOS) that is included in the IHS chassis, that is coupled to the processing system, and that is configured, in response to the function subsystem detection alert, to generate and transmit a BIOS inventory update; a management device that is included in the IHS chassis, that is coupled to the BIOS, and that is configured to receive the BIOS inventory update, determine whether the operating system is authorized to use the function subsystem at least in part based on the BIOS inventory update, and: in response to determining the operating system is authorized to use the function subsystem, allow the operating system to utilize the function subsystem; and in response to determining the operating system is not authorized to use the function subsystem, prevent the operating system from utilizing the function subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
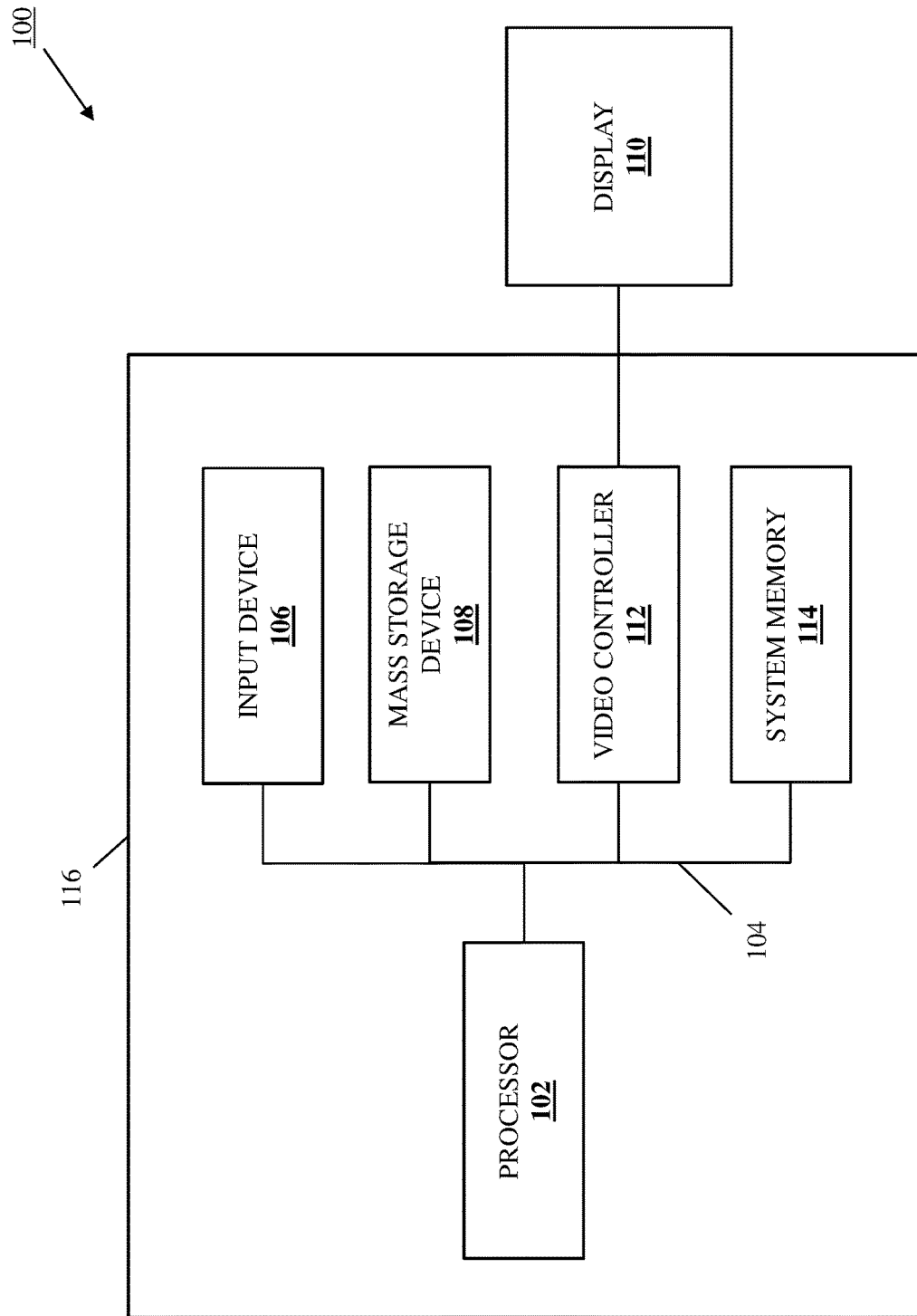
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
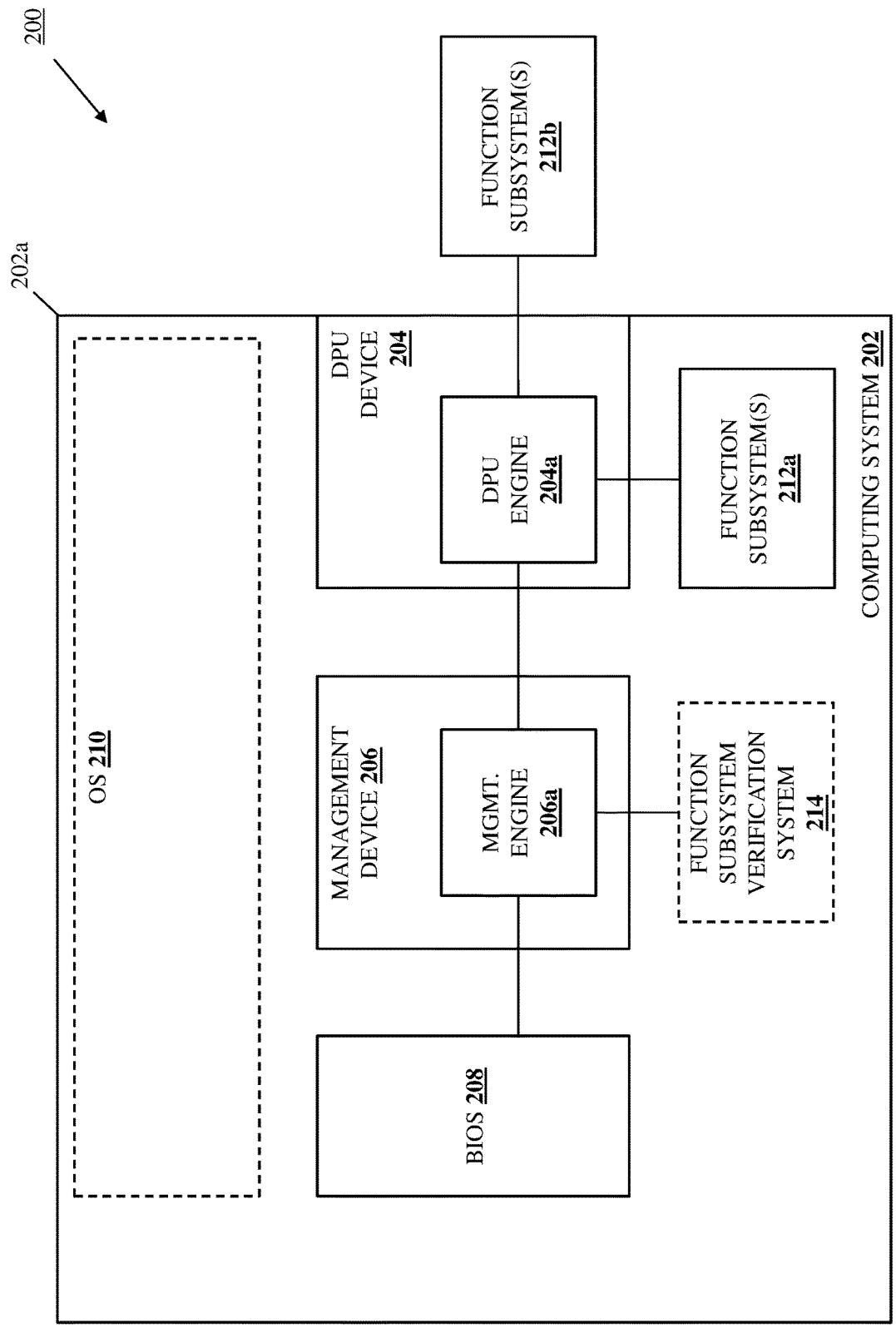
FIG. 2 is a schematic view illustrating an embodiment of computing system that may utilize the untrusted orchestrator device function subsystem inventory and verification system of the present disclosure.

Referring now to FIG. 2, an embodiment of an untrusted orchestrator function subsystem inventory and verification system 200 is illustrated that may be provided according to the teachings of the present disclosure. In the illustrated embodiment, the untrusted orchestrator function subsystem inventory and verification system 200 includes a computing system 202. In an embodiment, the computing system 202 may be provided by the IHS 100 discussed above with reference to FIG. 1, and/or may include some or all of the components of the IHS 100, and in the specific examples below is described as being provided by a server device. However, while illustrated and discussed as being provided by a server device, one of skill in the art in possession of the present disclosure will recognize that the computing system 202 provided in the untrusted orchestrator function subsystem inventory and verification system 200 may include any devices that may be configured to operate similarly as the computing system 202 discussed below.

In the illustrated embodiment, the computing system 202 includes a chassis 202a that houses the components of the computing system 202, only some of which are illustrated and discussed below. For example, the chassis 202a may house an untrusted orchestrator device that, in the examples provided herein is provided by an Data Processing Unit (DPU) device 204 that may be provided by BLUEFIELD® DPU devices available from NVIDIA® Corporation of Santa Clara, California, United States, DPU devices available from FUNGIBLE® Inc. of Santa Clara, California, United States, and/or other DPU devices known in the art, and that is configured to orchestrate the provisioning of function subsystems to an operating system that is provided using the computing system 202, discussed in further detail below. As will be appreciated by one of skill in the art in possession of the present disclosure, the DPU device 204 may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (TO) card that uses firmware configured to provided dedicated I/O and management functions, as in addition to firmware, the DPU device software stack will include a DPU operating system and a user space that is customizable to configure/program the DPU device to present function subsystems to an operating system in the computing system 202 outside the control of the computing system, which can render that DPU device "untrusted" in many scenarios.

For example, in some embodiments, a user of the computing system 202 may provide the DPU device 204 in that computing system 202 that has not been qualified/supported by the manufacturer of the computing system 202, thus rendering that DPU device 204 as "untrusted". However, in other examples, the DPU device 204 may have been qualified/supported by the manufacturer of the computing device 202, but the complex operation of the DPU device 204 (e.g., which may operate as a separate and distinct computing system from the computing system 202) may prevent the monitoring of its operation (e.g., its presenting of function subsystems to an operating system in the computing system 202), thus rendering that DPU device 204 as "untrusted". As such, while a user may provide a DPU device in a computing system that is supported by the manufacturer of that computing system, that DPU device may allow the user to run applications/services from that DPU that are capable of presenting function subsystems to an operating system that should be managed (e.g., via licenses) by a management device in the computing system, thus rendering that DPU device as "untrusted". In yet another example, a user may purchase a license from a manufacturer of the computing system 202 to present function subsystems to the operating system via a DPU device that is qualified/supported by the manufacturer of the computing device, and that DPU device may be "untrusted" due to its capability to present function subsystems to the operating system that are not included in that license. However, while illustrated and described below as being provided by an DPU device, one of skill in the art in possession of the present disclosure will appreciate how other untrusted orchestrator devices having similar functionality to the DPU device 204 discussed below will fall within the scope of the present disclosure as well.

In the illustrated embodiment, the DPU device 204 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a DPU engine 204a that is configured to present function subsystems that may be located inside and/or outside of the chassis 202a to an operating system, as well as perform any of the other functionality of the DPU engines and/or DPU devices discussed below.

The chassis 202a may also house a management device 206 that is coupled to the DPU device 204 and that is configured to both operate as a "root-of-trust" for the computing device, as well as manage function subsystems provided to an operating system by the DPU device 204. For example, the management device 206 may be provided by a remote access controller device such as, for example, the integrated DELL® Remote Access Controller (iDRAC) device available from DELL® Inc. of Round Rock, Texas, United States; a Baseboard Management Controller (BMC) device, a Platform Service Processor (PSP) device, and/or any other management devices that one of skill in the art in possession of the present disclosure would recognize as being capable of providing the functionality described below. However, while illustrated and described below as being provided by particular management devices, one of skill in the art in possession of the present disclosure will appreciate how other devices having similar functionality to the management device 206 discussed below will fall within the scope of the present disclosure as well.

In the illustrated embodiment, the management device 206 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management engine 206a that is configured to perform the functionality of the management engines and/or management devices discussed below. As illustrated, the management engine 206a may be coupled to the DPU engine 204a via, for example, a coupling between their corresponding processing systems, which may be provided by a management communication coupling, a "side-band" communication coupling, and/or other communications couplings that would be apparent to one of skill in the art in possession of the present disclosure.

The chassis 202a may also house a Basic Input/Output System (BIOS) 208 that is coupled to the management device 206 and that one of skill in the art in possession of the present disclosure will recognize may be provided by firmware that is configured to perform initialization operations (e.g., hardware initialization operations) for the computing system 202 during "booting", "power-on start-up", or other initialization of the computing system 202, runtime services for operating systems and/or other applications provided using the computing system 202, as well as any other BIOS operations that would be apparent to one of skill in the art in possession of the present disclosure. As illustrated, the BIOS 208 may be coupled to the management engine 206a (e.g., via a coupling between the BIOS firmware and the processing system that provides the management engine 206a) using any of a variety of communication couplings that would be apparent to one of skill in the art in possession of the present disclosure. Furthermore, while a "BIOS" is illustrated and described herein, one of skill in the art in possession of the present disclosure will appreciate how the BIOS 208 may be provided by a Unified Extensible Firmware Interface (UEFI) that is provided according to the UEFI specification that defines a software interface between an operating system provided by the computing system 202 and platform firmware included in the computing system 202, and which was introduced to replace the legacy BIOS while providing support for legacy BIOS services, while also enabling remote/network accessible diagnostics without the need for an operating system, as well as any other UEFI functionality that would be apparent to one of skill in the art in possession of the present disclosure.

As discussed above, the computing system 202 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an operating system ("OS") 210 that is configured to perform the functionality of the operating systems discussed below. Furthermore, one of skill in the art in possession of the present disclosure will appreciate how the operating system 210 may be provided by an operating system similar to those provided on desktop computing devices, laptop/notebook computing devices, tablet computing devices, and mobile phones; by a "hypervisor" operating system that is configured to create and provide virtual machines; and/or by any other operating systems that would be apparent to one of skill in the art in possession of the present disclosure. As such, the computing system 202 may be utilized via the operating system 210 provided using its processing system and memory system (also called a "host" operating system), as well as via other functionality subsystems that may be provided to the operating system 210.

For example, FIG. 2 illustrates how one or more function subsystems 212a may be included in the chassis 202 and may be accessible to the DPU device 204 (e.g., via a coupling between the DPU engine 204a and the function subsystem(s) 212a), and how one or more function subsystems 212b may be provided outside the chassis 202 and may be accessible to the DPU device 204 (e.g., via a coupling between the DPU engine 204a and the function subsystem(s) 212b). As discussed below, the function subsystems 212a and 212b may be accessible to the BIOS 208 in a manner that allows the BIOS 208 to identify the presence of the function subsystem(s) 212a and 212b, and one of skill in the art in possession of the present disclosure will appreciate how that accessibility may be provided in any manner that allows the BIOS 208 to identify the presentation of those functional subsystem(s) 212a and 212b to the operating system 210 as discussed in further detail below.

As discussed above, the function subsystems 212a and 212b may be provided by any physical function subsystems or virtual function subsystems that one of skill in the art in possession of the present disclosure would recognize as being utilized by the operating system 210. As such, the function subsystems 212a and 212b may include processing systems, memory systems, storage systems, networking systems, and/or other physical function subsystems that would be apparent to one of skill in the art in possession of the present disclosure, as well as virtual function subsystems that may be instantiated on any of those physical subsystems.

As illustrated in FIG. 2, the untrusted orchestrator function subsystem inventory and verification system 200 may also include a function subsystem verification system 214, which may be provided in the chassis 202a or outside the chassis 202a (as indicated by the dashed lines used to illustrate the function subsystem verification system 214). For example, in some embodiments the function subsystem verification system 214 may be provided by the management device 206 (e.g., by the management engine 206a or another engine in the management device 206 that is coupled to the management engine 206a), while in other embodiments, the function subsystem verification system 214 may be connected to the management engine 206a in the management device 206 via a network. To provide a specific example, a manufacturer of the computing system 202 may provide a network-accessible function subsystem verification system 214, and the management engine 206a in the management device 206 may be coupled to a network and configured to access that network-accessible function subsystem verification system 214 to allow for the functionality discussed below. However, while a few specific examples have been described, one of skill in the art in possession of the present disclosure will appreciate how the function subsystem verification functionality discussed below may be provided in a variety of manners that will fall within the scope of the present disclosure as well.

As discussed above, the management device 206 may be provided in the computing system 202 in order to manage the function subsystems that are presented to the operating system 210 in order to, for example, ensure that only licensed function subsystems or licensed types of function subsystems are provided to the operating system 210 by an untrusted orchestrator device provided by the DPU device 204. However, absent the teachings of the present disclosure, the management device 206 will not have direct and reliable visibility into the function subsystems provided to the operating system 210 by the DPU device 204, as any inventory of operating-system-provided function subsystems provided by the DPU device 204 to the management device 206 cannot be trusted for the same reasons the DPU device 204 is untrusted. Furthermore, the management capabilities of the management device 206 with the DPU device 204 do not extend to the provisioning of function subsystems by the DPU device 204 to the operating system 210, and absent the teachings of the present disclosure the management device 206 would have no capability to verify or manage function subsystems provided to the operating system 210 by the DPU device 204. As such, absent the teachings of the present disclosure, at any time the DPU device 204 is capable of changing the function subsystems provided to the operating system 210, and thus a malicious DPU device (or an DPU device under malicious control) may provide unauthorized function subsystems to the operating system 210 without any knowledge of the management device 206.

Figure 3:
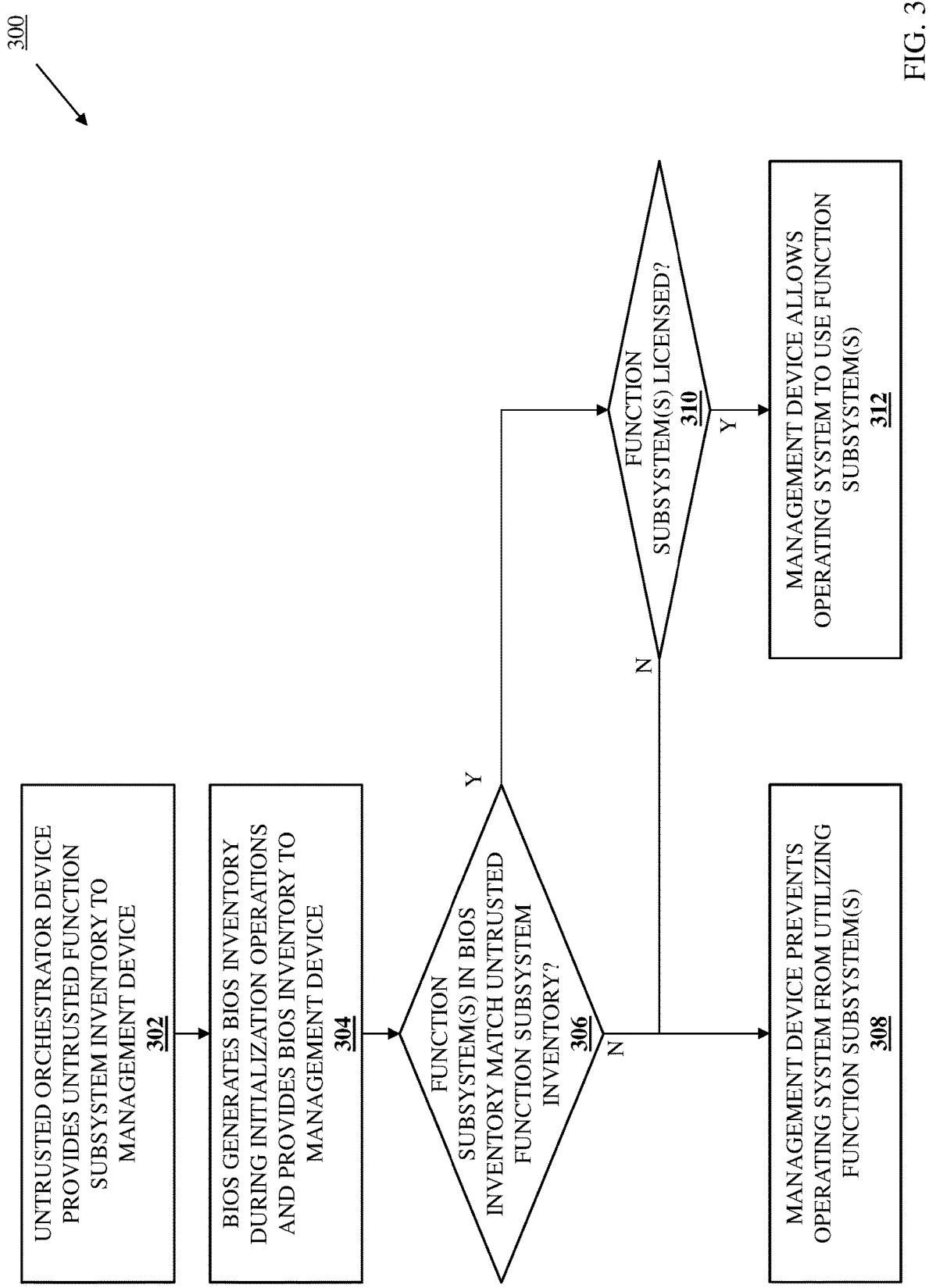
FIG. 3 is a flow chart illustrating an embodiment of a method for inventorying and verifying function subsystems presented to an operating system during initialization operations by an untrusted orchestrator device.

Referring now to FIG. 3, an embodiment of a method 300 for inventorying and verifying function subsystems presented to an operating system during initialization operations by an untrusted orchestrator device is illustrated. As discussed below, the systems and methods of the present disclosure provide for the inventorying and verification of function subsystems presented to an operating system during initialization operations by an untrusted orchestrator device. For example, the untrusted orchestrator function subsystem inventory and verification system of the present disclosure may include an untrusted orchestrator device, an operating system, a BIOS, and a management device. In response to presentation by the untrusted orchestrator device of a function subsystem to the operating system during initialization operations, the BIOS generates and transmits a BIOS inventory. The management device receives the BIOS inventory, and determines whether the operating system is authorized to use the function subsystem at least in part based on the BIOS inventory. If so, the management device allows the operating system to utilize the function subsystem while, if not, the management device prevents the operating system from utilizing the function subsystem. As such, function subsystems presented to an operating system during initialization operations by an untrusted orchestrator device may be inventoried and verified before being provided to that operating system.

Figure 4:
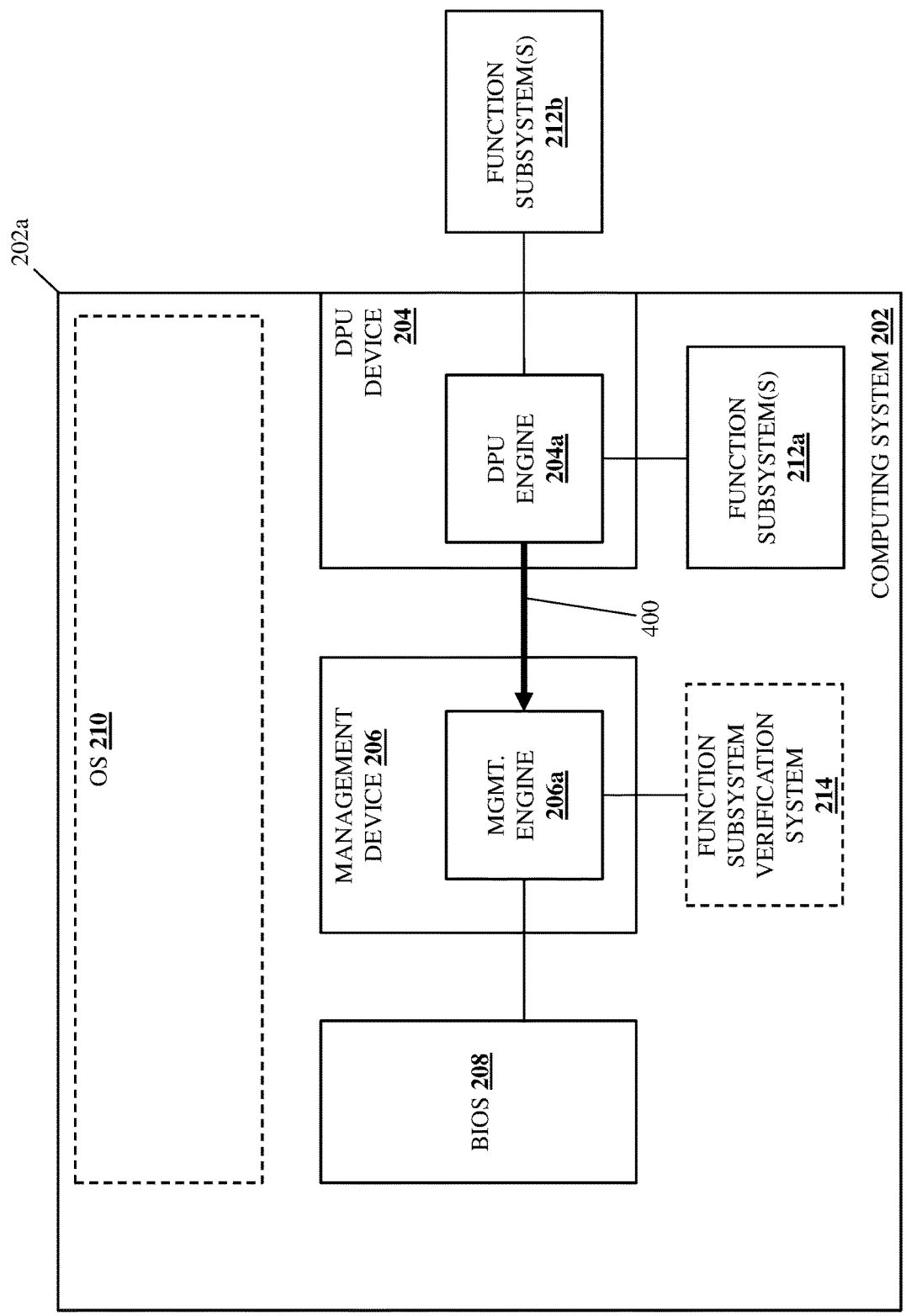
FIG. 4 is a schematic view illustrating an embodiment of the computing system of FIG. 2 operating during the method of FIG. 3.

The method 300 begins at block 302 where an untrusted orchestrator device provides an untrusted function subsystem inventory to a management device. With reference to FIG. 4, in an embodiment of block 302, the DPU engine 204a in the DPU device 204 of the computing system 202 (e.g., a server device) may perform untrusted function subsystem inventory provisioning operations 400 that may include providing an untrusted function subsystem inventory to the management engine 206a in the management device 206, and while not illustrated or discussed in detail herein, one of skill in the art in possession of the present disclosure will recognize how the management engine 206a may store the untrusted function subsystem inventory in a database provided in a storage system that is included in the management device 206 and/or otherwise accessible to the management engine 206a. In a specific example, the untrusted function subsystem inventory may be provided to the management device 206 via the management communication coupling, side-band communication coupling, and/or other communication couplings discussed above, and in some cases may identify changes in a device presentation layer associated with the computing system 202 (e.g., changes from one or more untrusted function subsystem inventories that were previously provided to the management device 206).

As will be appreciated by one of skill in the art in possession of the present disclosure, the untrusted function subsystem inventory may identify function subsystems that may be configured for presentation to operating system(s) provided using the computing system 202 by the DPU device 204 (e.g., following the initialization operations described herein), and thus may identify physical function subsystems (e.g., devices) or virtual function subsystems that may be provided using physical function subsystems, either of which may be included within or located outside of the chassis 202a of the computing system 202. However, while a specific untrusted function subsystem inventory is described, one of skill in the art in possession of the present disclosure will appreciate how untrusted function subsystem inventories may be provided in other manners that will fall within the scope of the present disclosure as well.

One of skill in the art in possession of the present disclosure will also appreciate that the untrusted function subsystem inventory may be provided to the management device 206 at different times. For example, the method 300 describes the inventorying and verification of function subsystems that are presented to an operating system during initialization operations for the computing system 202, and thus the untrusted function subsystem inventory may be provided to the management device 206 prior to those initialization operations (e.g., during a runtime environment for the computing system 202 that occurs prior to those initialization operations), as part of those initialization operations (e.g., following a power-on, reset, and/or other initialization of the computing system 202), and/or at any other time that would be apparent to one of skill in the art in possession of the present disclosure.

Figure 5:
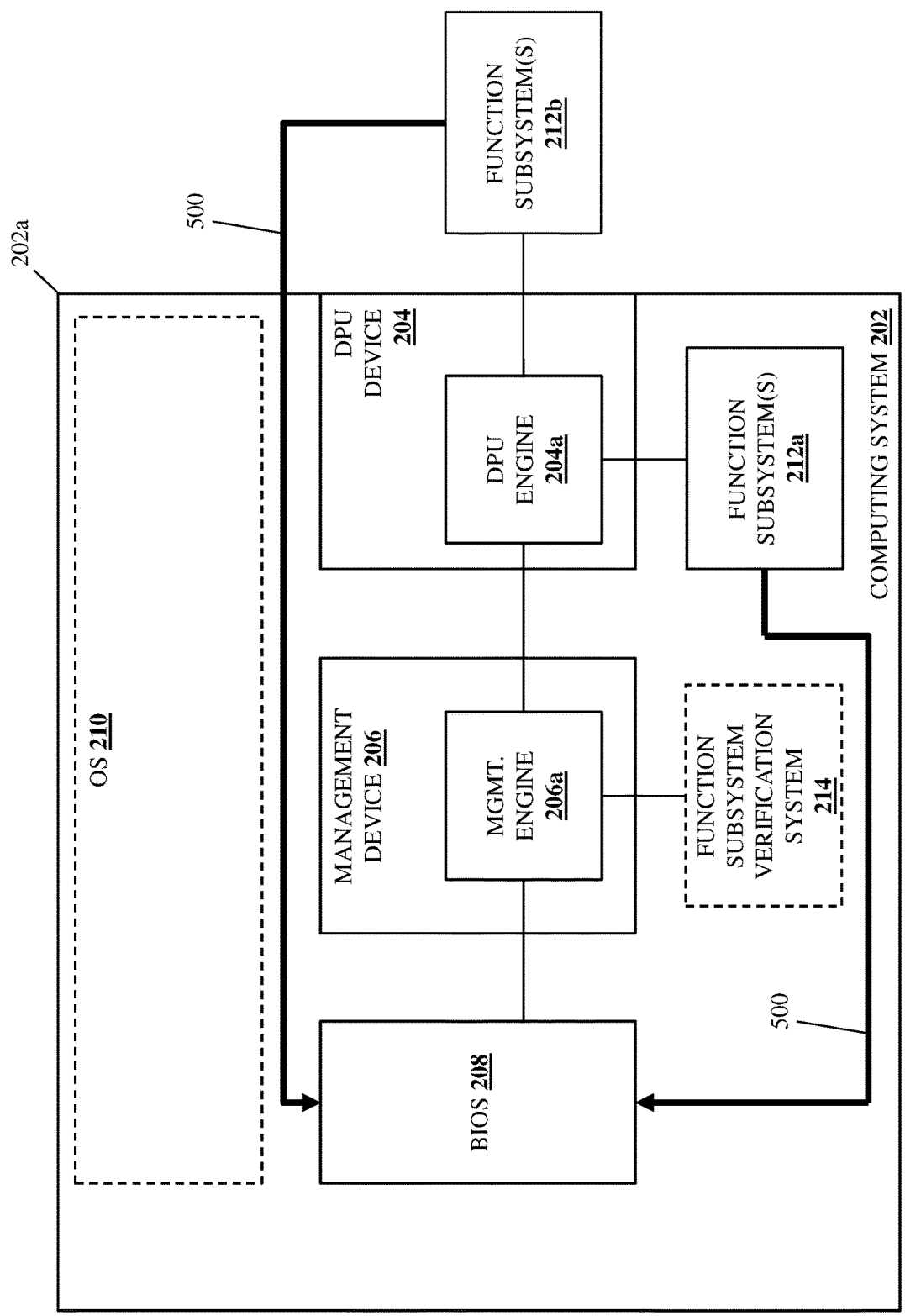
FIG. 5 is a schematic view illustrating an embodiment of the computing system of FIG. 2 operating during the method of FIG. 3.

The method 300 then proceeds to block 304 where a BIOS generates a BIOS inventory during initialization operations and provides the BIOS inventory to the management device. With reference to FIG. 5, in an embodiment of block 304, the BIOS 208 may perform BIOS inventory generation operations 500 that may include identifying any of the function subsystems that are accessible to the BIOS 208 and, in response, generating a BIOS inventory that identifies those function subsystems. In the embodiment illustrated in FIG. 5, the BIOS 208 is illustrated as identifying the function subsystem(s) 212a that are included in the chassis 202a (e.g., that are coupled to a motherboard or other circuit board in the chassis 202a), as well as the function subsystem(s) 212b that are located outside of the chassis 202a (e.g., that are coupled to a connector that is accessible on the chassis 202a, accessible via a network, etc.).

In a specific example, at block 304 the computing system 202 may be powered-on, reset, and/or otherwise initialized and, in response, the BIOS 208 may perform the BIOS inventory generation operations 500 that include performing scanning operations (e.g., PCIe device scanning operations) that are configured to identify any devices (e.g., PCIe devices) or virtual functions enabled by devices that are configured for presentation to the operating system 210 once it is provided subsequent to the initialization operations described herein. As will be appreciated by one of skill in the art in possession of the present disclosure, a function subsystem may be configured for presentation to an operating system if that function subsystem is coupled to the processing system and/or memory system that provide the operating system in any manner that would, absent the systems and methods described herein, allow the operating system to utilize that function subsystem during runtime of the computing system 202. In an embodiment, the scanning operations discussed above may detect any PCIe device that is configured for presentation on a DPU-enabled port of the DPU device 204. However, while a specific example of a PCIe device scanning operation has been described that identifies PCIe devices and/or functions configured for presentation to the operation system 210, one of skill in the art in possession of the present disclosure will appreciate how different function subsystems may be identified as being configuration for presentation to the operating system 210 at block 804 while remaining within the scope of the present disclosure as well.

As such, at block 304 the BIOS 208 may generate the BIOS inventory that identifies each of the function subsystems that are accessible to the BIOS 208 and that are configured to be presented to the operating system 210 by the DPU device 204 following the initialization operations, and one of skill in the art in possession of the present disclosure will appreciate how the BIOS inventory may identify those function subsystems using any of a variety of techniques known in the art. As discussed below, some embodiments of block 304 may result in the generation of a BIOS inventory that identifies only function subsystems that are also accessible to the DPU device 204, while other embodiments of block 304 may result in the generation of a BIOS inventory that identifies at least some function subsystems that are not accessible to the DPU device 204. To provide a specific example, function subsystems that are not accessible to the DPU device 204 may include networking cards, storage devices, and/or other PCIe devices that are physically connected to connectors on the computing system 202 that are not accessible to the DPU device 204, although one of skill in the art in possession of the present disclosure will appreciate how function subsystems may be inaccessible to the DPU device 204 based on other factors that will fall within the scope of the present disclosure as well.

Figure 6:
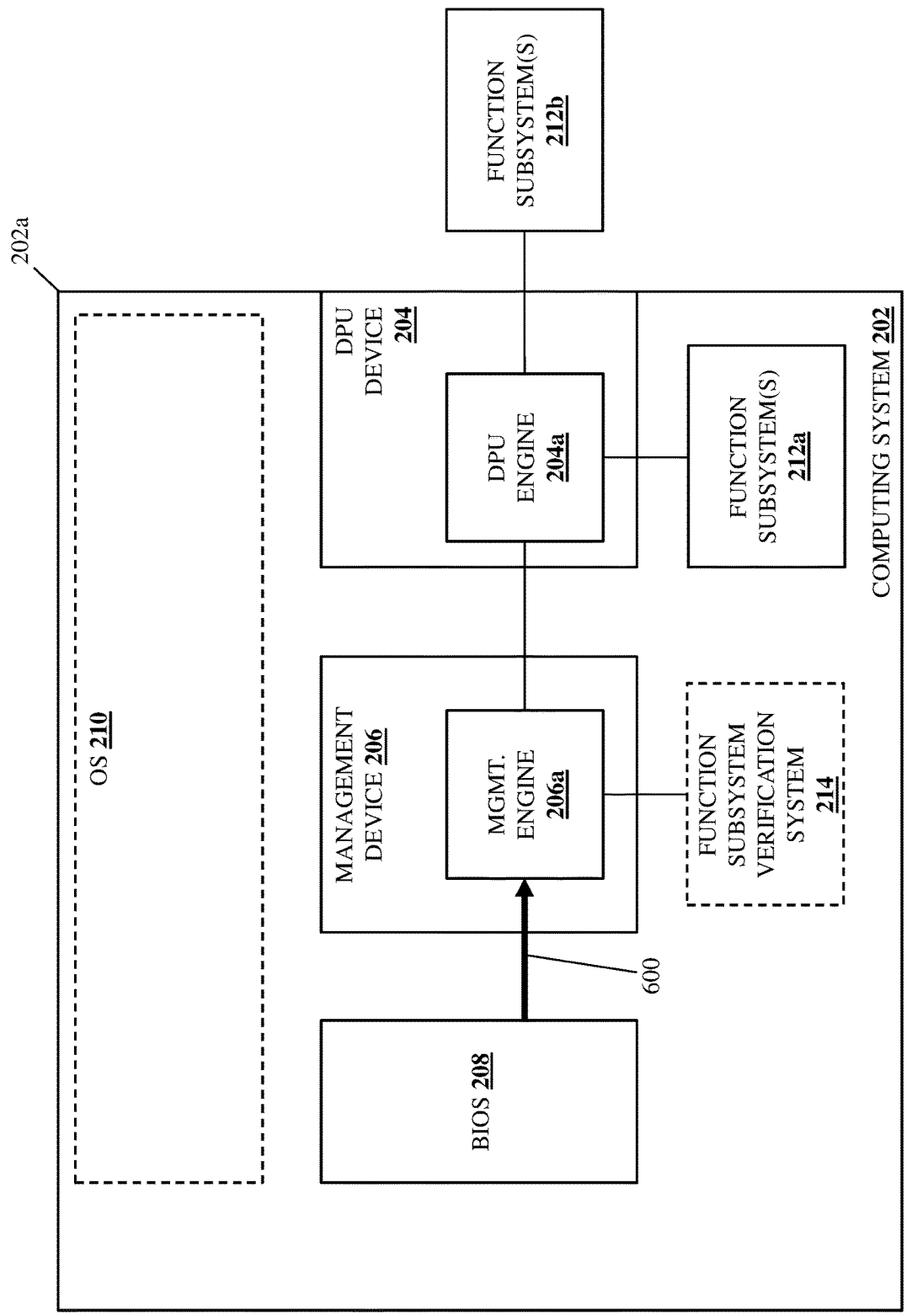
FIG. 6 is a schematic view illustrating an embodiment of the computing system of FIG. 2 operating during the method of FIG. 3.
Figure 7:
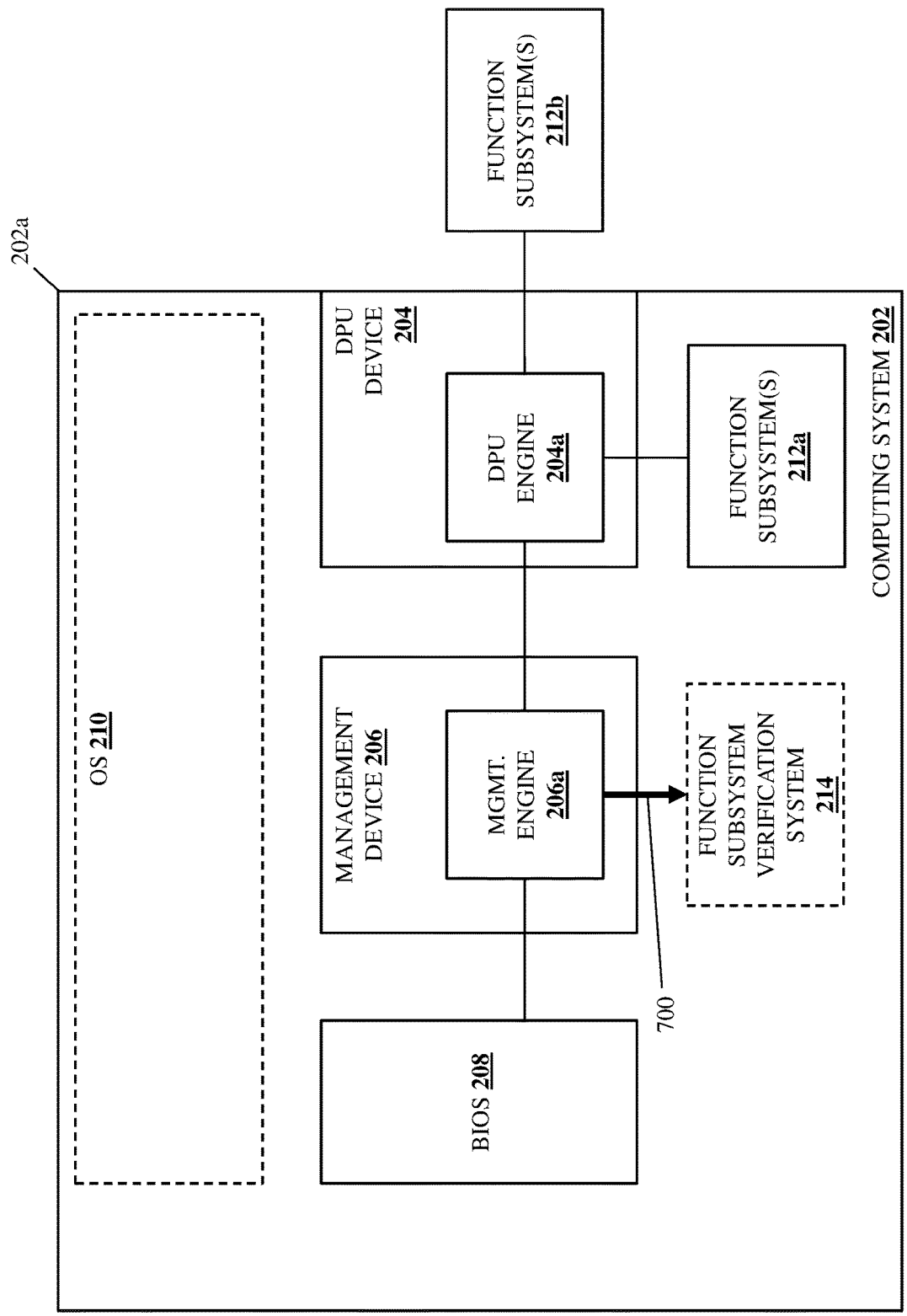
FIG. 7 is a schematic view illustrating an embodiment of the computing system of FIG. 2 operating during the method of FIG. 3.

With reference to FIG. 6, in an embodiment of block 304, the BIOS 208 may perform BIOS inventory provisioning operations 600 that may include providing the BIOS inventory generated at block 304 to the management engine 206a in the management device 206, and while not illustrated or discussed in detail herein, one of skill in the art in possession of the present disclosure will recognize how the management engine 206a may store the BIOS inventory in a database provided in a storage system that is included in the management device 206 and/or otherwise accessible to the management engine 206a. In many embodiments, the provisioning of the BIOS inventory to the management device 206 may be performed during the initialization operations for the computing system 202, although some embodiments may include the provisioning of the BIOS inventory to the management device 206 during runtime for the computing system 202 and prior or subsequent to the initialization operations discussed above.

The method 300 may then proceed with the management device 206 determining whether the operating system is authorized to use function subsystem(s), which in the specific examples below involves determining whether function subsystems identified in the BIOS inventory match function subsystems identified in the untrusted function subsystem inventory, and determining the operating system is not authorized to use function subsystems that are identified in the BIOS inventory that do not match function subsystems identified in the untrusted function subsystem inventory, while if the function subsystems identified in the BIOS inventory match the function subsystems identified in the untrusted function subsystem inventory, determining whether a license exists for those function systems, determining the operating system is authorized to use those function subsystems for which a license exists, and determining the operating system is not authorized to use those function subsystems for which a license does not exists. However, while specific factors are described as being utilized to determine whether the operating system is authorized to use function subsystems, one of skill in the art in possession of the present disclosure will appreciate how either factor described below, as well as other factors, may be used to determine whether an operating system may utilize a function subsystem while remaining within the scope of the present disclosure as well.

For example, one of skill in the art in possession of the present disclosure will appreciate how "best practices" may involve the DPU device reporting any function subsystem it presents to the operating system in an untrusted function subsystem inventory, but will recognize that some scenarios may include the DPU device presenting function subsystem(s) to the operating system that are not reported in an untrusted function subsystem inventory but that are licensed for use in the computing system. As such, in some embodiments the determination of whether a license exists for a function system identified in a BIOS inventory may be the only factor utilized to determine whether the operating system is authorized to use that function subsystem.

The method 300 may then proceed to decision block 306 where it may be determined whether the function subsystems in the BIOS inventory match the untrusted function subsystem inventory. In an embodiment, at decision block 306, the management engine 206a in the management device 206 may perform BIOS inventory/untrusted function subsystem inventory match determination operations 700 that may include providing the BIOS inventory and untrusted function subsystem inventory to the function subsystem verification system 214, which as discussed above may be included in/provided by the management device 206 in some embodiments, and may be coupled to the management device 206 via a network in other embodiments.

As such, decision block 306 may include the function subsystem verification system 214 comparing the BIOS inventory to the untrusted function subsystem inventory to determine whether each of the function subsystem(s) identified in the BIOS inventory match the function subsystems identified in the untrusted function subsystem inventory. As discussed above, the untrusted function subsystem inventory cannot be trusted due to the untrusted nature of the DPU device 204, and thus the BIOS inventory may be checked against the untrusted function subsystem inventory to determine whether the any function subsystems that are configured to be presented to the operating system 210 by the DPU device 204 (e.g., configured for presentation to the operating system 210 on a DPU-enabled port on the DPU device 204, as determined by the BIOS 208 as discussed above) match those reported as configured to be presented to the operating system by the DPU device 204. Similarly as discussed above, in many embodiments the BIOS inventory/untrusted function subsystem inventory match determination operations may be performed during the initialization operations for the computing system 202, although some embodiments may include performing the BIOS inventory/untrusted function subsystem inventory match determination operations prior or subsequent to the initialization operations discussed above.

If, at decision block 306, it is determined that one or more function subsystems in the BIOS inventory do not match the untrusted function subsystem inventory, the method 300 proceeds to block 308 where the management device may prevent the operating system from utilizing those function subsystem(s). In an embodiment, at block 308 and in response to identifying function subsystem(s) in the BIOS inventory that do not match function subsystem(s) identified in the untrusted function subsystem inventory, the function subsystem verification system 214 may provide that determination to the management engine 206a, and the management engine 206a may perform function subsystem utilization prevention operations in order to prevent the use of those function subsystem(s) by the operating system 210. For example, in some embodiments of block 308. the function subsystem(s) that are identified in the BIOS inventory and not in the untrusted function subsystem inventory may introduce a severe enough security issue that the use the computing system 202 may be prevented in order to prevent the operating system 210 from utilizing those function subsystem(s).

Figure 8A:
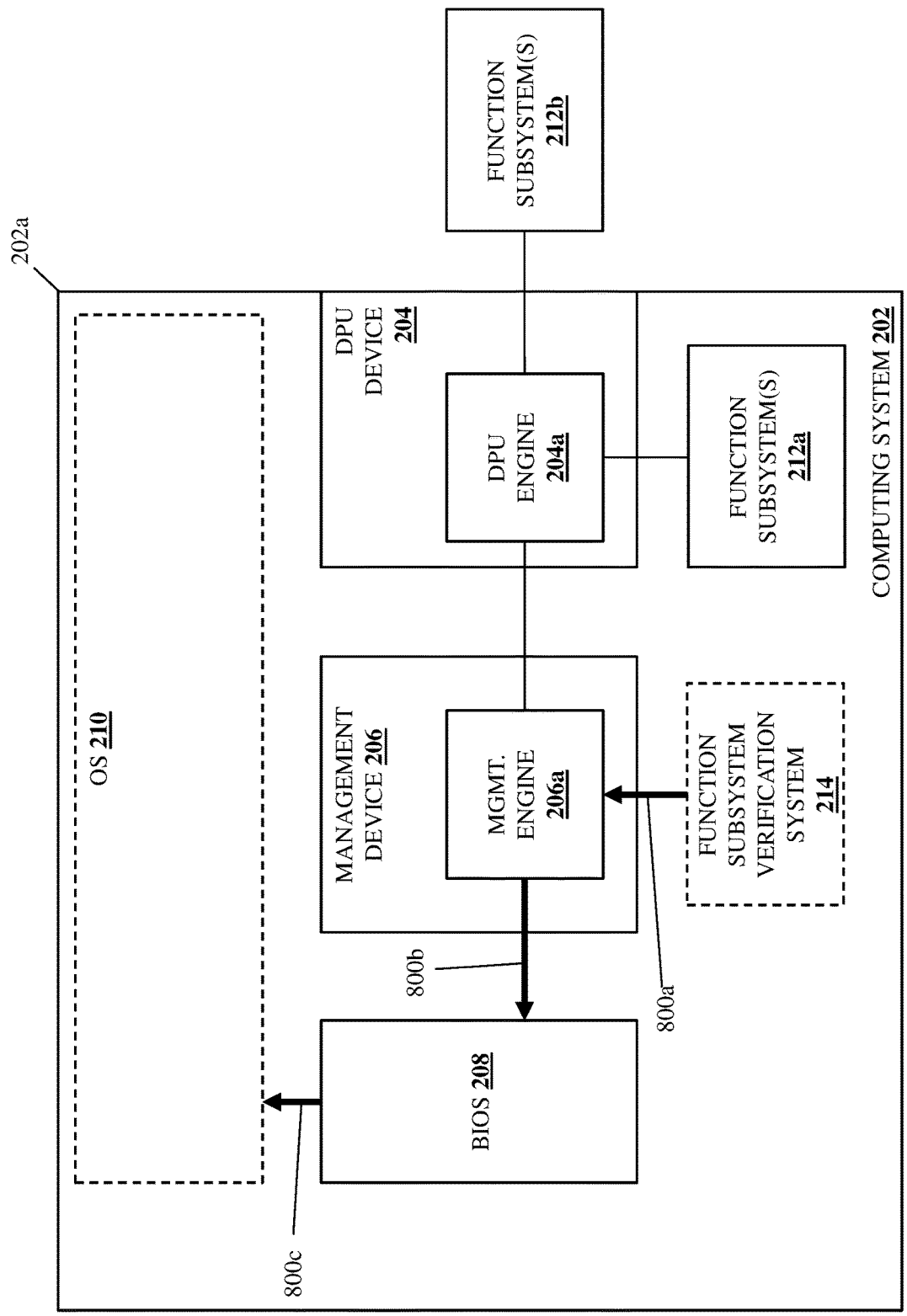
FIG. 8A is a schematic view illustrating an embodiment of the computing system of FIG. 2 operating during the method of FIG. 3.

With reference to FIG. 8A, an embodiment of block 308 is illustrated in which each of the function subsystems 212a and 212b identified in the BIOS inventory do not match the function subsystems identified in the untrusted function subsystem inventory and, in response, the function verification subsystem 214 performs function subsystem utilization prevention operations 800a that may include providing a function subsystem utilization prevention instruction to the management engine 206a in the management device 206, and the management engine 206a performs function subsystem utilization prevention operations 800b that may include providing a function subsystem utilization prevention instruction to the BIOS 208. In response to receiving the function subsystem utilization prevention instruction, the BIOS 208 may then perform function subsystem utilization prevention operations 800c that may include preventing the utilization of the function subsystems 212a and 212b by the operating system 210, which is illustrated in FIG. 8A by a lack of the function subsystems 212a and 212b in the operating system 210. For example, one of skill in the art in possession of the present disclosure will appreciate how the BIOS 208 may prevent the utilization of the function subsystem(s) 212a and 212b by the operating system 210 by ensuring that the function subsystem(s) 212a and 212b are not "visible" to the operating system 210, disabling the function subsystem(s) 212a and 212b, and/or performing any other BIOS operations that one of skill in the art in possession of the present disclosure would recognize as preventing function subsystem utilization by an operating system.

As such, the operating system 210 will be prevented from utilizing the function subsystem(s) 212a and 212b, which are configured for presentation to the operating system 210 by the DPU device 204 in a manner that would otherwise allow the operating system 210 to utilize those function subsystem(s) 212a and 212b during runtime of the computing system 202, thus preventing those function subsystem(s) 212a and 212b from being "provided" to that operating system 210. Furthermore, in the event the utilization of any of the function subsystem(s) 212a and 212b by the operating system 210 cannot be prevented, the use of the computing system 202 may be prevented similarly as described above.

Figure 8B:
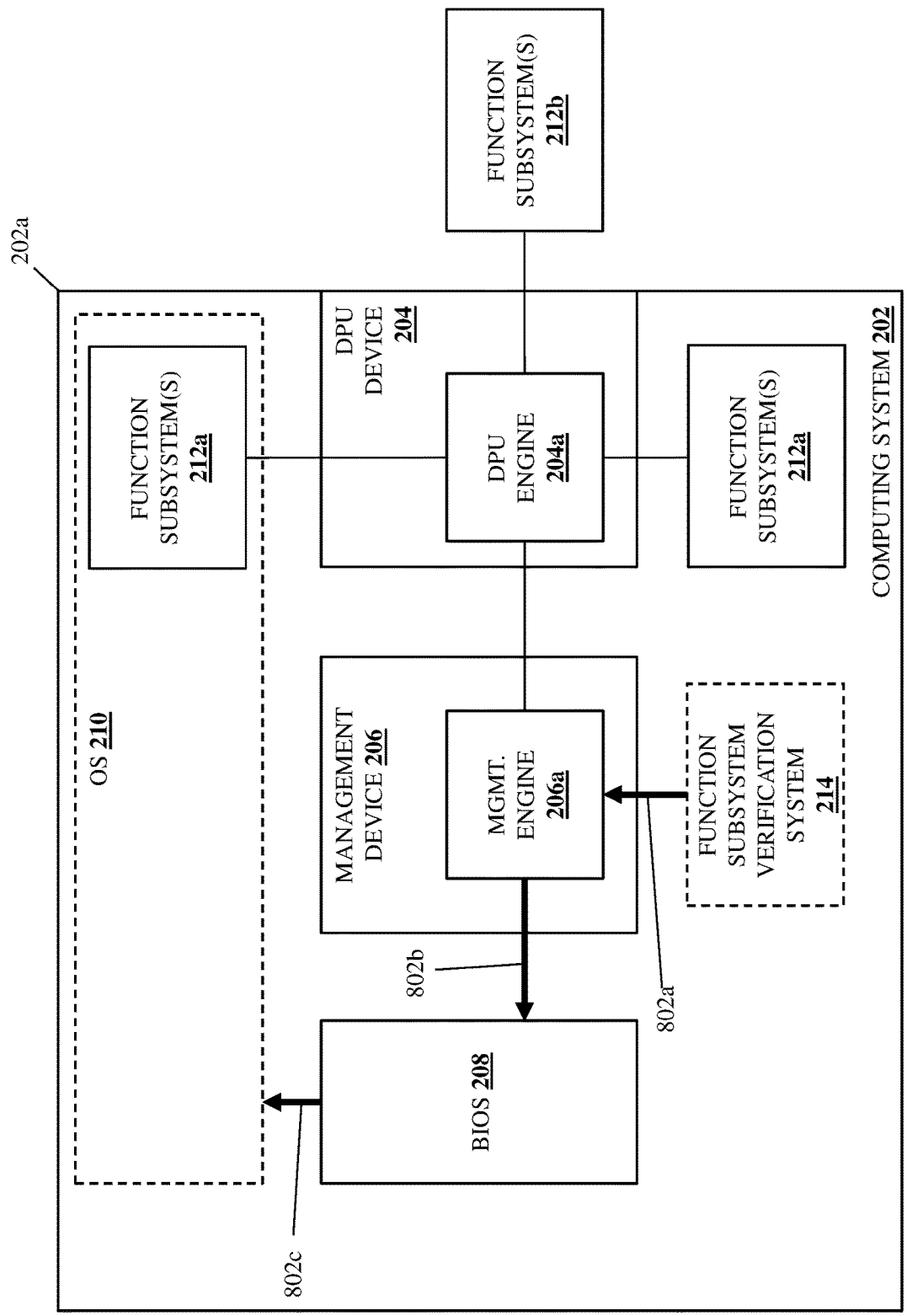
FIG. 8B is a schematic view illustrating an embodiment of the computing system of FIG. 2 operating during the method of FIG. 3.

With reference to FIG. 8B, an embodiment of block 308 is illustrated in which the function subsystem(s) 212b identified in the BIOS inventory do not match the function subsystems identified in the untrusted function subsystem inventory and, in response, the function verification subsystem 214 performs function subsystem utilization prevention operations 802a that may include providing a function subsystem utilization prevention instruction to the management engine 206a in the management device 206, and the management engine 206a performs function subsystem utilization prevention operations 802b that may include providing a function subsystem utilization prevention instruction to the BIOS 208. In response to receiving the function subsystem utilization prevention instruction, the BIOS 208 may then perform function subsystem utilization prevention operations 802c that may include preventing the utilization of the function subsystem(s) 212b by the operating system 210, which is illustrated in FIG. 8B by a lack of the function subsystem(s) 212b in the operating system 210. For example, one of skill in the art in possession of the present disclosure will appreciate how the BIOS 208 may prevent the utilization of the function subsystem(s) 212b by the operating system 210 by ensuring that the function subsystem(s) 212b are not "visible" to the operating system 210, disabling the function subsystem(s) 212b, and/or performing any other BIOS operations that one of skill in the art in possession of the present disclosure would recognize as preventing function subsystem utilization by an operating system.

As such, the operating system 210 will be prevented from utilizing the function subsystem(s) 212b, which are configured for presentation to the operating system 210 by the DPU device 204 in a manner that would otherwise allow the operating system 210 to utilize those function subsystem(s) 212b during runtime of the computing system 202, thus preventing those function subsystem(s) 212b from being "provided" to that operating system 210. Furthermore, in the event the utilization of any of the function subsystem(s) 212b by the operating system 210 cannot be prevented, the use of the computing system 202 may be prevented similarly as described above.

Figure 8C:
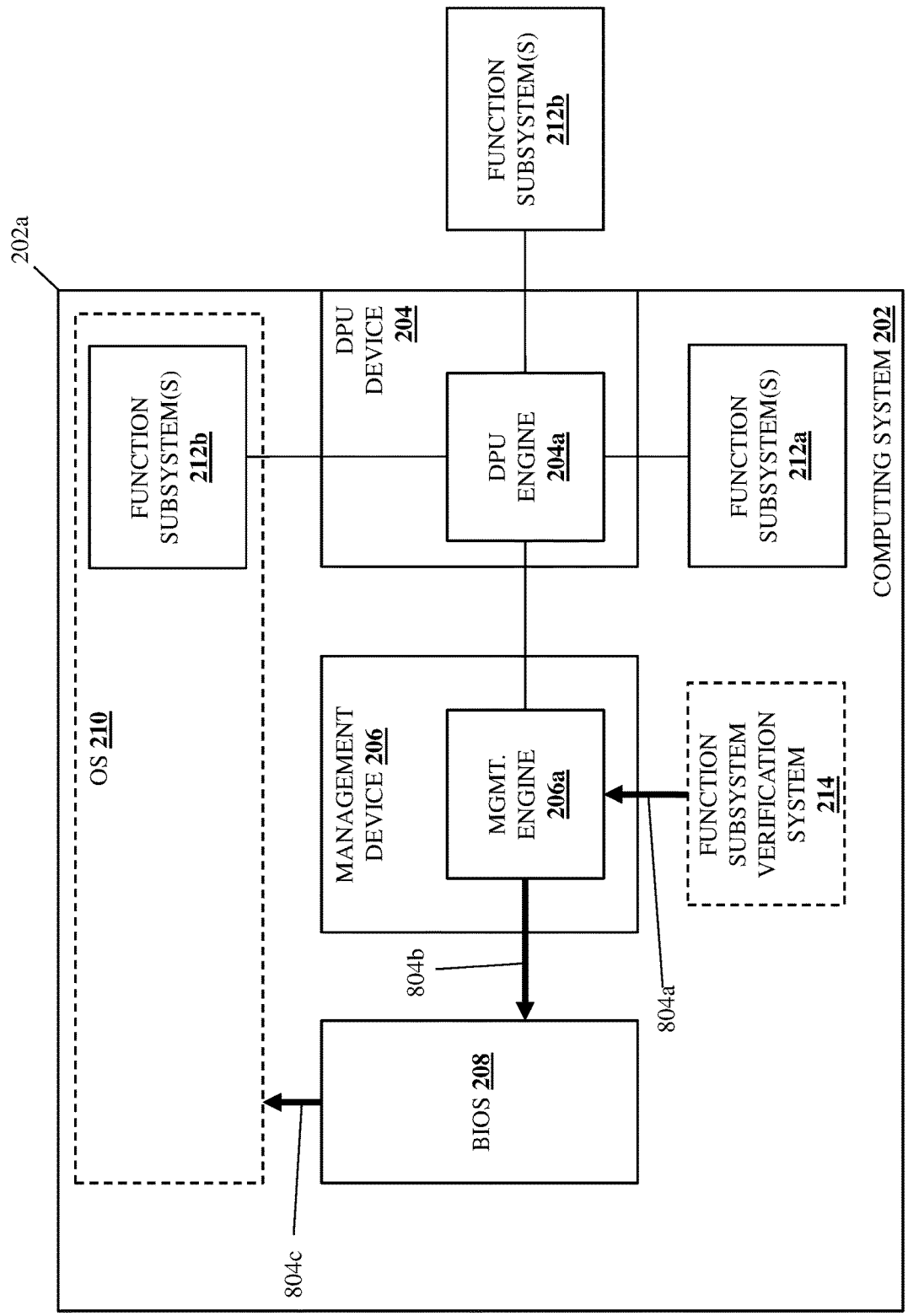
FIG. 8C is a schematic view illustrating an embodiment of the computing system of FIG. 2 operating during the method of FIG. 3.

With reference to FIG. 8C, an embodiment of block 308 is illustrated in which the function subsystems 212a identified in the BIOS inventory do not match the function subsystems identified in the untrusted function subsystem inventory and, in response, the function verification subsystem 214 performs function subsystem utilization prevention operations 804a that may include providing a function subsystem utilization prevention instruction to the management engine 206a in the management device 206, and the management engine 206a performs function subsystem utilization prevention operations 804b that may include providing a function subsystem utilization prevention instruction to the BIOS 208. In response to receiving the function subsystem utilization prevention instruction, the BIOS 208 may then perform function subsystem utilization prevention operations 804c that may include preventing the utilization of the function subsystem(s) 212a by the operating system 210, which is illustrated in FIG. 8C by a lack of the function subsystem(s) 212a in the operating system 210. For example, one of skill in the art in possession of the present disclosure will appreciate how the BIOS 208 may prevent the utilization of the function subsystem(s) 212a by the operating system 210 by ensuring that the function subsystem(s) 212a are not "visible" to the operating system 210, disabling the function subsystem(s) 212a, and/or performing any other BIOS operations that one of skill in the art in possession of the present disclosure would recognize as preventing function subsystem utilization by an operating system.

As such, the operating system 210 will be prevented from utilizing the function subsystem(s) 212a, which are configured for presentation to the operating system 210 by the DPU device 204 in a manner that would otherwise allow the operating system 210 to utilize those function subsystem(s) 212a during runtime of the computing system 202, thus preventing those function subsystem(s) 212a from being "provided" to that operating system 210. Furthermore, in the event the utilization of any of the function subsystem(s) 212a by the operating system 210 cannot be prevented, the use of the computing system 202 may be prevented similarly as described above.

As such, some embodiments of the method 300 may operate to prevent the use of any function subsystem that is configured for presentation to the operating system 210 on a DPU-enabled port on the DPU device 204 but not reported in an untrusted function subsystem inventory by the DPU device 204. However, as discussed above, some function subsystems may be accessible to the BIOS 208 and not the DPU device 204, and thus the provisioning of those function subsystems to the operating system 210 may be based on other factors (e.g., the license considerations described below) rather than their being reported in the untrusted function subsystem inventory discussed herein. Furthermore, as discussed above, some scenarios may include the DPU device presenting function subsystem(s) to the operating system that are not reported in an untrusted function subsystem inventory but that are licensed for use in the computing system and, in some embodiments, the determination of whether a license exists for a function system identified in a BIOS inventory may be the only factor utilized to determine whether the operating system is authorized to use that function subsystem.

If at decision block 306, it is determined that function subsystems in the BIOS inventory match the untrusted function subsystem inventory, the method 300 proceeds to decision block 310 where it is determined whether those function subsystem(s) are licensed. In an embodiment, at decision block 310 and following the performance of the untrusted function subsystem inventory/BIOS inventory match determination operations 700 and a determination that the function subsystems identified in the BIOS inventory match the function subsystems identified in the untrusted function subsystem inventory, the function subsystem verification system 214 may perform license determination operations that include determining whether a license exists for those function subsystems. As will be appreciated by one of skill in the art in possession of the present disclosure, a license for any function subsystem may be accessible to the function subsystem verification system 214 (e.g., securely stored in the management device 206, in a secure storage that is accessible via a network, etc.), and thus for any function subsystem that is identified in the BIOS inventory as well as in the untrusted function subsystem inventory, a determination may be made whether a license exists for that function subsystem.

In a specific example, the management device 206 (or a separate function subsystem verification system 214 that is accessible to the management device 206) may store a "licensing list" or other database of function subsystems that are licensed for use by the DPU device 204, and one of skill in the art in possession of the present disclosure will appreciate how such a database may store licensing files such as cryptographically signed and verifiable licenses for each function subsystem that is licensed for use by the DPU device 204. Furthermore, such a licensing list or database may be maintained by the management device 206 (or a separate function subsystem verification system 214 that is accessible to the management device 206), and may be static or configurable (e.g., modifiable) via a management device interface using techniques that would be apparent to one of skill in the art in possession of the present disclosure. Thus, an authorized entity may define the function subsystems available for presentation to the operating system 210 via the management device 206 and/or the function subsystem verification system 214.

If, at decision block 310, it is determined that the function subsystem(s) are not licensed, the method 300 proceeds to block 308 where the management device prevents the operating system from utilizing those function subsystem(s). In an embodiment, at block 308 and in response to determining that a license does not exist for a function subsystem that is identified in the BIOS inventory as well as in the untrusted function subsystem inventory, the method 300 may proceed to block 308 and operate substantially as described above to prevent the operating system 210 from utilizing any function subsystem for which a license does not exist.

If, at decision block 310, it is determined that the function subsystem(s) are licensed, the method 300 proceeds to block 312 where the management device allows the operating system to use those function subsystem(s). In an embodiment, at block 312 and in response to determining that a license exists for a function subsystem that is identified in the BIOS inventory as well as in the untrusted function subsystem inventory, the management engine 206a in the management device 206 may perform function subsystem utilization allowance operations in order to allow the use of those function subsystem(s) by the operating system 210. For example, in embodiments in which the method 300 is performed during initialization operations for the computing system 202, block 312 may include (or be followed by) the completion of those initialization operations such that the computing system 202 enters runtime, and the operating system 210 is provided and able to utilize the function subsystem(s) that are both licensed and identified in both the BIOS inventory and the untrusted function subsystem inventory.

Figure 8D:
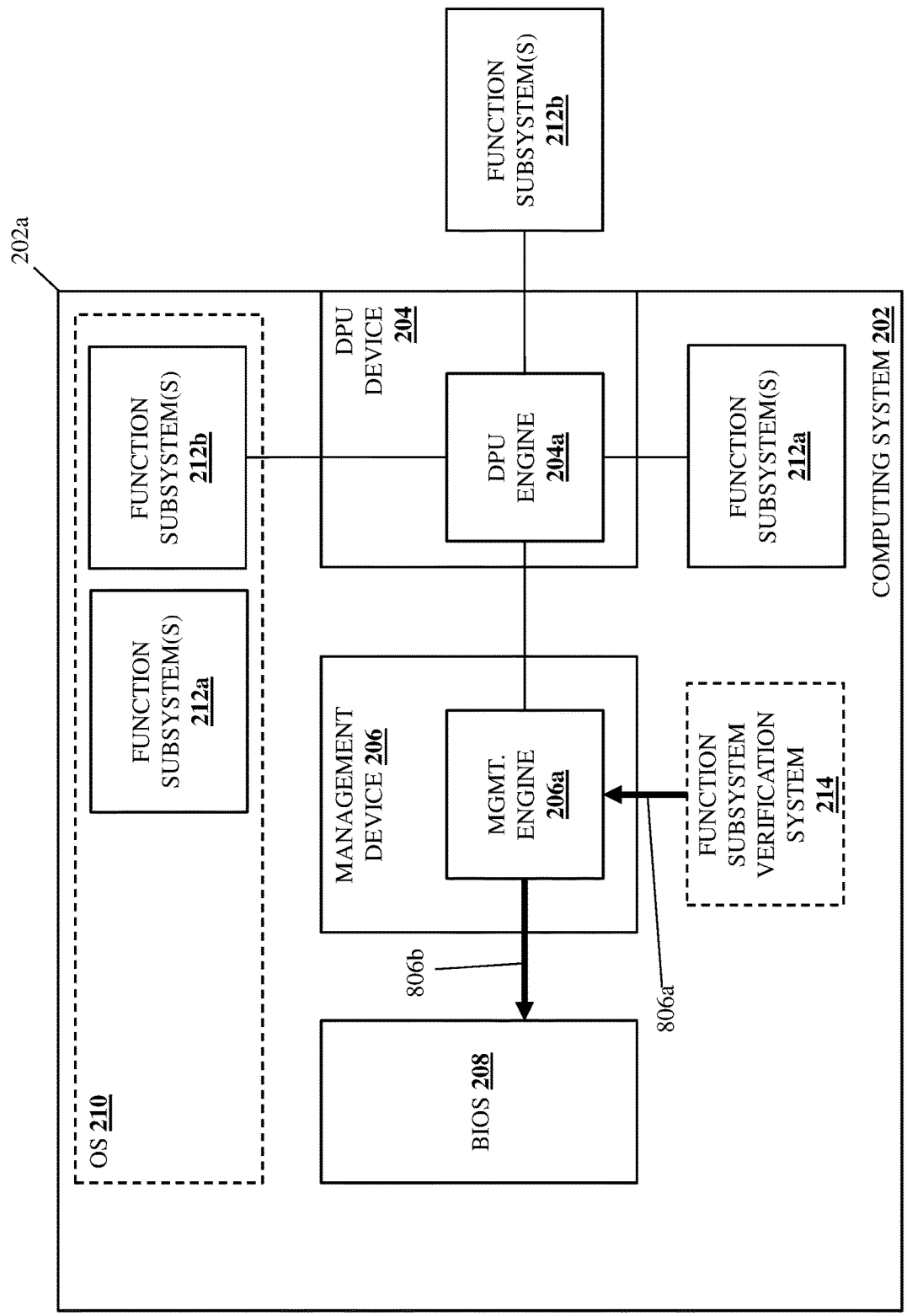
FIG. 8D is a schematic view illustrating an embodiment of the computing system of FIG. 2 operating during the method of FIG. 3.

With reference to FIG. 8D, an embodiment of block 312 is illustrated in which each of the function subsystems 212a and 212b identified in the BIOS inventory match the function subsystems identified in the untrusted function subsystem inventory, and a determination is made that licenses exist for both function subsystems 212a and 212b. In response, the function subsystem verification system 214 performs function subsystem utilization allowance operations 806a that may include providing a function subsystem utilization allowance instruction to the management engine 206a in the management device 206, and the management engine 206a performs function subsystem utilization prevention operations 806b that may include providing a function subsystem utilization allowance instruction to the BIOS 208. In response to receiving the function subsystem utilization allowance instruction, the BIOS 208 may allow the utilization of the function subsystems 212a and 212b by the operating system 210, which is illustrated in FIG. 8D by the function subsystems 212a and 212b being included in the operating system 210. Furthermore, one of skill in the art in possession of the present disclosure will appreciate how similar function subsystem utilization allowance operations may result in similar operations by BIOS 208 in the example provided with reference to FIG. 8B (e.g., as illustrated in FIG. 8B by the function subsystem(s) 212a being included in the operating system 210), as well as in the example provided with reference to FIG. 8C (e.g., as illustrated in FIG. 8C by the function subsystem(s) 212b being included in the operating system 210). For example, one of skill in the art in possession of the present disclosure will appreciate how the BIOS 208 may allow the utilization of the function subsystem(s) by the operating system 210 by ensuring that the function subsystem(s) are "visible" to the operating system 210, ensuring the function subsystem(s) are enabled, and/or performing any other BIOS operations one of skill in the art in possession of the present disclosure would recognize as allowing function subsystem utilization by an operating system.

In some embodiments, the function subsystem utilization allowance operations "performed" by the BIOS 208 may require no action being performed by the BIOS 208, with the BIOS 208 defaulting to allowing the utilization of the function subsystem(s) by the operating system 210. However, one of skill in the art in possession of the present disclosure will appreciate how the function subsystem utilization allowance operations may be performed by the BIOS 208 similar to the function subsystem utilization prevention instructions described in the examples above (and in some cases with the BIOS 208 instead defaulting to preventing the utilization of the function subsystem(s) by the operating system 210).

Figure 9:
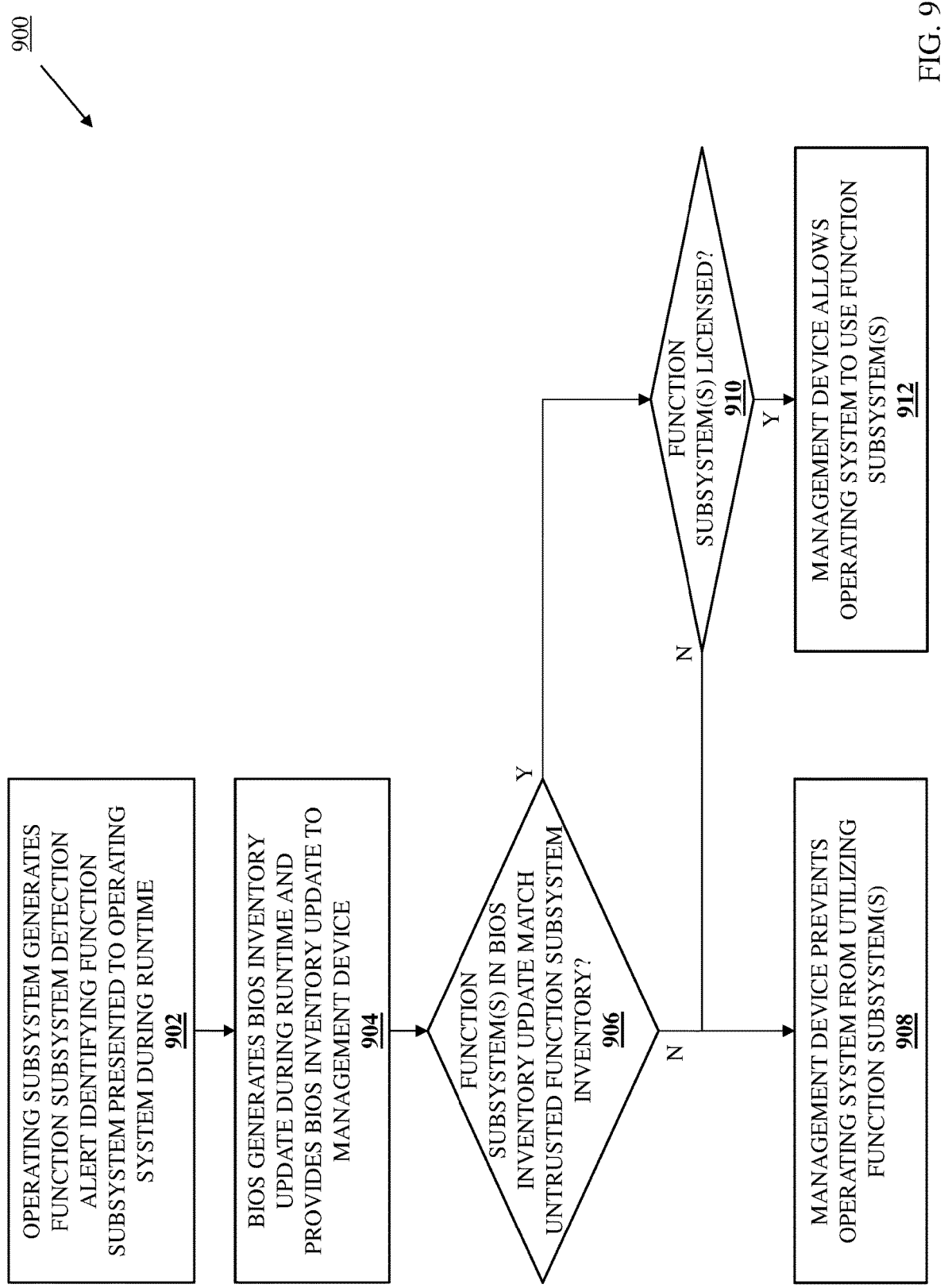
FIG. 9 is a flow chart illustrating an embodiment of a method for inventorying and verifying function subsystems presented to an operating system during runtime by an untrusted orchestrator device.

Referring now to FIG. 9, an embodiment of a method 900 for inventorying and verifying function subsystems presented to an operating system during runtime by an untrusted orchestrator device is illustrated. As discussed below, the systems and methods of the present disclosure provide for the inventorying and verification of function subsystems presented to an operating system during runtime by an untrusted orchestrator device. For example, the untrusted orchestrator function subsystem inventory and verification system of the present disclosure may include an untrusted orchestrator device, an operating system, a BIOS, and a management device. In response to presentation by the untrusted orchestrator device of a function subsystem to the operating system during runtime, the operating system generates a function subsystem detection alert that identifies the function subsystem. In response to the function subsystem detection alert, the BIOS generates and transmits a BIOS inventory update that identifies the function subsystem. The management device receives the BIOS inventory update, and determines whether the operating system is authorized to use the function subsystem. If so, the management device allows the operating system to utilize the function subsystem while, if not, the management device prevents the operating system from utilizing the function subsystem. As such, function subsystems presented to an operating system during runtime by an untrusted orchestrator device may be inventoried and verified before being provided to that operating system.

Figure 10:
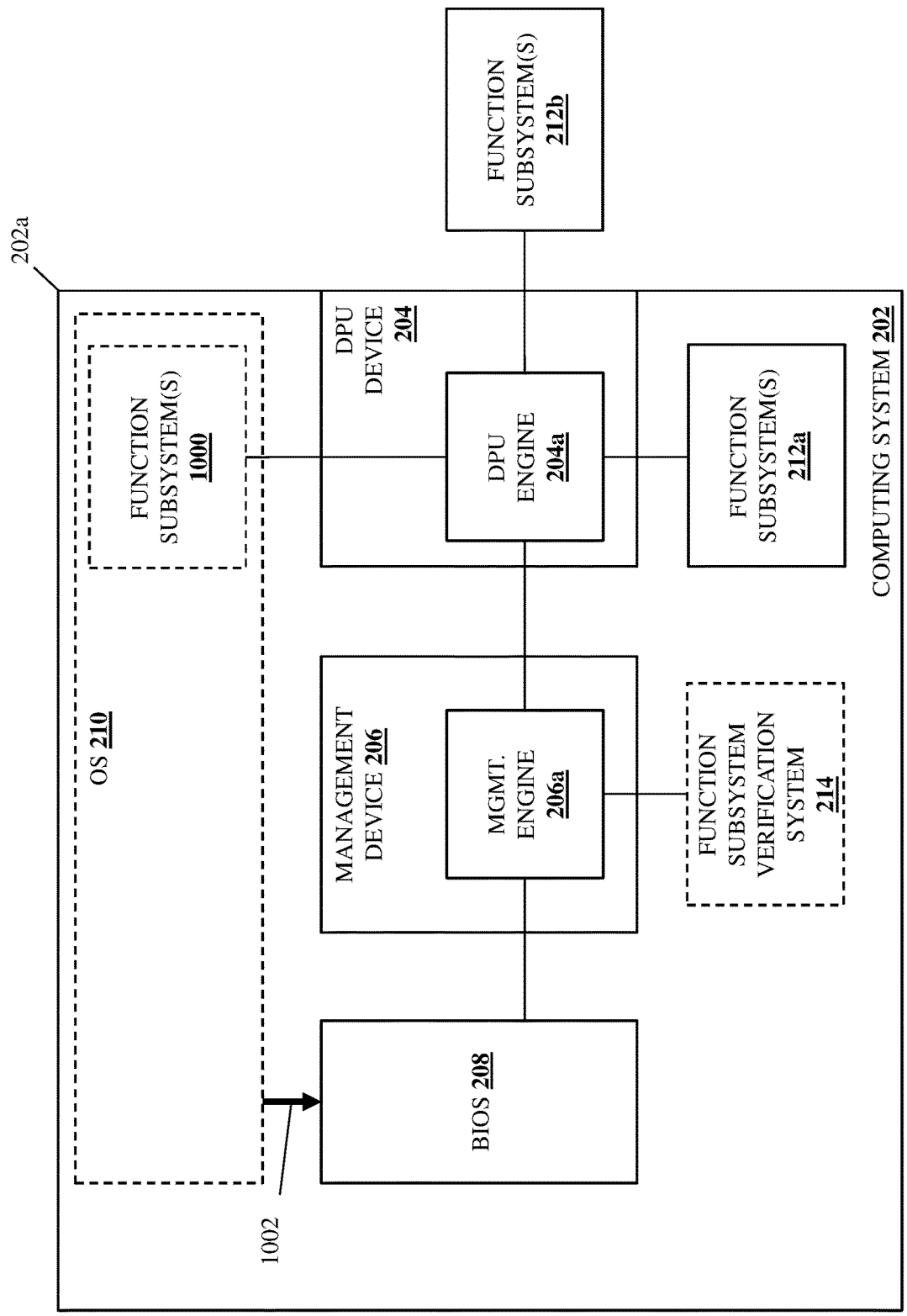
FIG. 10 is a schematic view illustrating an embodiment of the computing system of FIG. 2 operating during the method of FIG. 3.

The method 900 begins at block 902 where the operating system generates a function subsystem detection alert identifying a function subsystem presented to the operating system during runtime. With reference to FIG. 10, in an embodiment of block 902 and during runtime of the computing system 202 (e.g., following initialization operations for the computing system 202 such that the operating system 210 is provided using the computing system 202), one or more function subsystem(s) 1000 may be presented to the operating system 210 (i.e., rather than "provided" in a manner that allows the operating system 210 to utilize the function subsystem(s) 1000, as illustrated by the dashed lines used for the function subsystem(s) 1000) and, in response, the operating system 210 may perform function subsystem detection alert generation operations 1002 that include generating a function subsystem detection alert that is provided to the BIOS 208.

For example, at block 902, a physical function subsystem (e.g., a device) may be coupled to the computing system 202 such that it is presented to the operating system 210, or a virtual function subsystem may be instantiated by a physical function subsystem such that it is coupled to the computing system 202 and presented to the operating system 210. As will be appreciated by one of skill in the art in possession of the present disclosure, the presentation of a function subsystem to the operating system 210 during runtime for the computing system 202 may result from a configuration change to the computing system 202 performed by the DPU device 204, an unauthorized function subsystem coupling to the computing system 202 that allows that function subsystem to present itself to the operating system 210, and/or other function subsystem presentation scenarios that would be apparent to one of skill in the art in possession of the present disclosure.

Similarly as discussed above, a function subsystem may be presented to an operating system if that function subsystem is coupled to the processing system and/or memory system that provide the operating system in any manner that would, absent the systems and methods described herein, allow the operating system to utilize that function subsystem. In an embodiment, the operating system 210 may be configured to detect the presentation of function subsystems to the operating system 210 and, in response, generate a function subsystem detection alert. For example, in response to the presentation of the function subsystem(s) 1000 to the operating system 210, a platform event and/or "hot-plug" event (e.g., the function subsystem detection alert) may be generated by the operating system 210. In a specific example, the function subsystem detection alert may be provided by an Advanced Power and Configuration Interface (ACPI) hot plug event construct that, as discussed below, is configured to trigger the BIOS 208 to generate the BIOS inventory update discussed below, although one of skill in the art in possession of the present disclosure will appreciate how the function subsystem detection alert may be provided using other techniques that will fall within the scope of the present disclosure as well. As will be appreciated by one of skill in the art in possession of the present disclosure, the "hot-plug" event discussed above may allow the BIOS 208 to identify the coupling of the function subsystem to the processing system and/or memory system that provide the operating system prior to the operating system being able to access that function subsystem, and thus the detection of the function subsystem and generation of the function subsystem detection alert by the "operating system" is not meant to require an ability by the operating system to access that function subsystem.

The method 900 then proceeds to block 904 where a BIOS generates a BIOS inventory update during initialization operations and provides the BIOS inventory update to the management device. In an embodiment of block 904, the BIOS 208 may perform BIOS inventory update generation operations that may include identifying the function subsystem(s) that are accessible to the BIOS 208 and, in response, generating a BIOS inventory update that identifies those function subsystem similarly to the BIOS inventory discussed above.

In a specific example, the BIOS 208 may perform the BIOS inventory update generation operations 500 that include performing scanning operations (e.g., PCIe device scanning operations) that are configured to identify any devices (e.g., PCIe devices) or virtual functions provided by devices that are presented to the operating system 210. As discussed above, a function subsystem may be presented to an operating system if that function subsystem is coupled to the processing system and/or memory system that provide the operating system in any manner that would, absent the systems and methods described herein, allow the operating system to utilize that function subsystem during runtime of the computing system 202. In an embodiment, the scanning operations discussed above may detect any PCIe device that is configured for presentation on a DPU-enabled port on the DPU device 204. However, while a specific example of a PCIe device scanning operation has been described that identifies PCIe devices and/or functions presented to the operation system 210, one of skill in the art in possession of the present disclosure will appreciate how different function subsystems may be identified as being presented to the operating system 210 at block 904 while remaining within the scope of the present disclosure as well.

As such, at block 904 the BIOS 208 may generate the BIOS inventory update that identifies each of the function subsystems that are accessible to the BIOS 208 and that are presented to the operating system 210 during runtime, and one of skill in the art in possession of the present disclosure will appreciate how the BIOS inventory update may identify those function subsystems using any of a variety of techniques known in the art. As discussed below, some embodiments of block 904 may result in the generation of a BIOS inventory update that identifies only function subsystems that are also accessible to the DPU device 204, while other embodiments of block 904 may result in the generation of a BIOS inventory update that identifies at least some function subsystems that are not accessible to the DPU device 204. To provide a specific example, function subsystems that are not accessible to the DPU device 204 may include networking cards, storage devices, and/or other PCIe devices that are physically connected to connectors on the computing system 202 that are not accessible to the DPU device 204, although one of skill in the art in possession of the present disclosure will appreciate how function subsystems may be inaccessible to the DPU device 204 based on other factors that will fall within the scope of the present disclosure as well.

Figure 11:
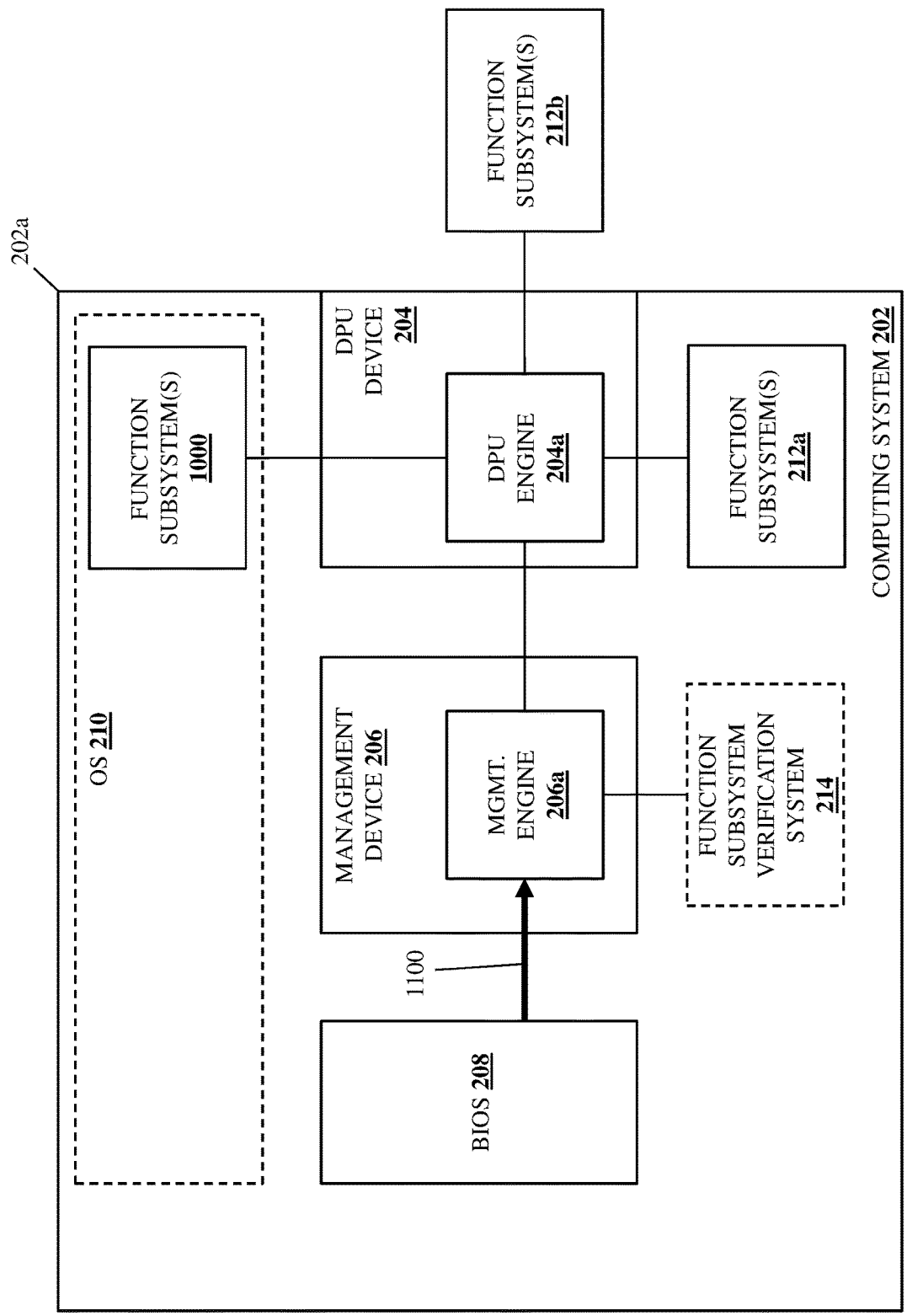
FIG. 11 is a schematic view illustrating an embodiment of the computing system of FIG. 2 operating during the method of FIG. 3.
Figure 12:
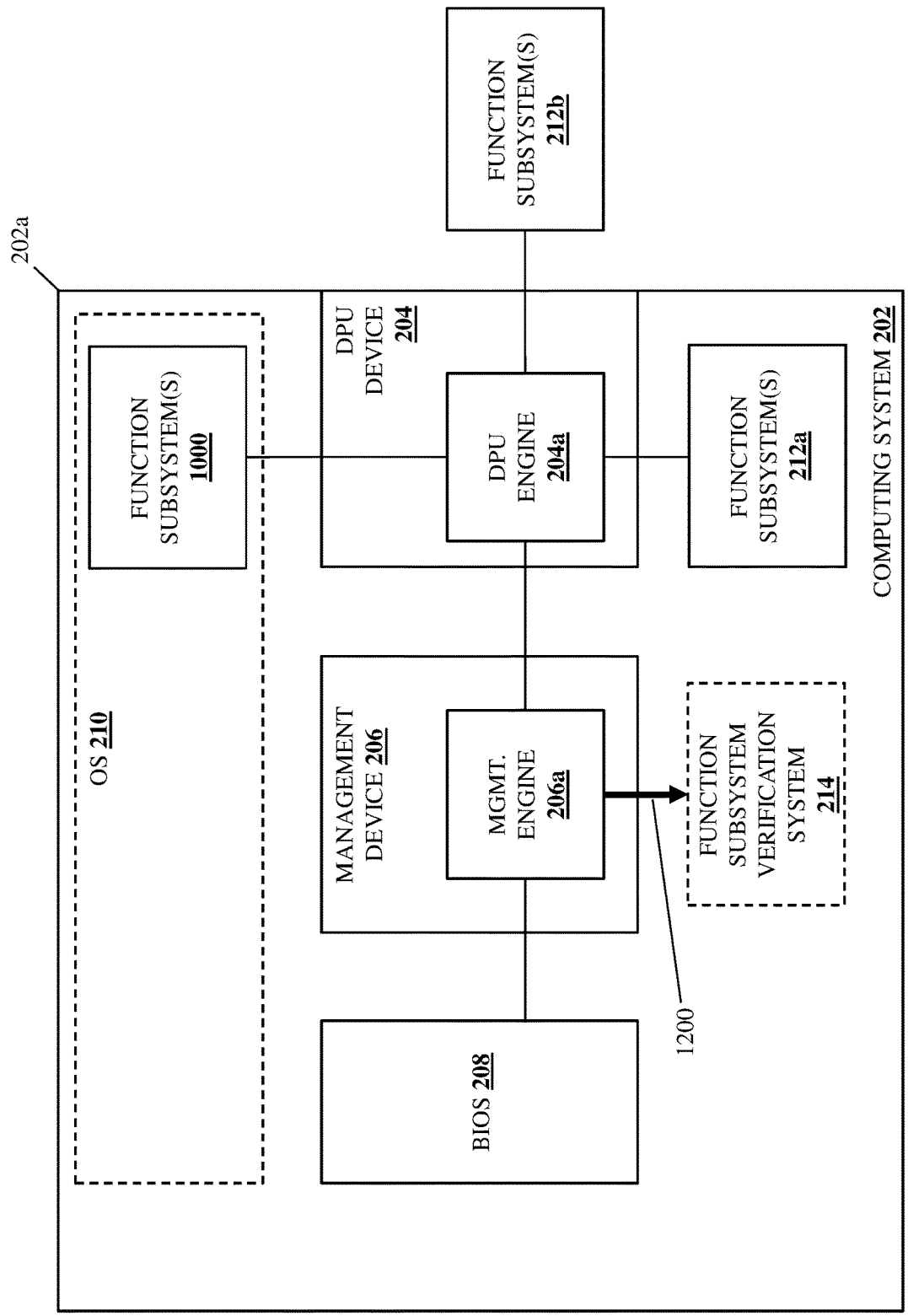
FIG. 12 is a schematic view illustrating an embodiment of the computing system of FIG. 2 operating during the method of FIG. 3.

With reference to FIG. 11, in an embodiment of block 904, the BIOS 208 may perform BIOS inventory update provisioning operations 1100 that may include providing the BIOS inventory generated at block 904 to the management engine 206*a* in the management device 206, and while not illustrated or discussed in detail herein, one of skill in the art in possession of the present disclosure will recognize how the management engine 206*a* may store the BIOS inventory update in a database provided in a storage system that is included in the management device 206 and/or otherwise accessible to the management engine 206*a*.

The method 900 may then proceed with the management device 206 determining whether the operating system is authorized to use function subsystem(s), which in the specific examples below involves determining whether function subsystems identified in the BIOS inventory update (which is based on the) function subsystem detection alert match function subsystems identified in the untrusted function subsystem inventory, and determining the operating system is not authorized to use function subsystems that are identified in the BIOS inventory update that do not match function subsystems identified in the untrusted function subsystem inventory, while if the function subsystems identified in the BIOS inventory update match the function subsystems identified in the untrusted function subsystem inventory, determining whether a license exists for those function systems, determining the operating system is authorized to use those function subsystems for which a license exists, and determining the operating system is not authorized to use those function subsystems for which a license does not exists. However, while specific factors are described as being utilized to determine whether the operating system is authorized to use function subsystems, one of skill in the art in possession of the present disclosure will appreciate how either factor described below, as well as other factors, may be used to determine whether an operating system may utilize a function subsystem while remaining within the scope of the present disclosure as well.

Similarly as discussed above, one of skill in the art in possession of the present disclosure will appreciate how "best practices" may involve the DPU device reporting any function subsystem it presents to the operating system in an untrusted function subsystem inventory, but will recognize that some scenarios may include the DPU device presenting function subsystem(s) to the operating system that are not reported in an untrusted function subsystem inventory but that are licensed for use in the computing system. As such, in some embodiments the determination of whether a license exists for a function system identified in a BIOS inventory may be the only factor utilized to determine whether the operating system is authorized to use that function subsystem.

The method 900 then proceeds to decision block 906 where it is determined whether one or more function subsystems in the BIOS inventory update match the untrusted function subsystem inventory. In an embodiment, at decision block 906, the management engine 206*a* in the management device 206 may perform BIOS inventory update/untrusted function subsystem inventory match determination operations 1200 that may include transmitting the BIOS inventory update and the untrusted function subsystem inventory (which was previously received from the DPU device 204 as discussed above) to the function subsystem verification system 214, which as discussed above may be included in the management device 206 in some embodiments, and may be coupled to the management device 206 via a network in other embodiments. As such, decision block 306 may include the function subsystem verification system 214 comparing the BIOS inventory update and the untrusted function subsystem inventory to determine whether each of the function subsystem(s) identified in the BIOS inventory update match the function subsystems identified in the untrusted function subsystem inventory.

If, at decision block 906, it is determined that one or more function subsystems in the BIOS inventory update do not match the untrusted function subsystem inventory, the method 900 proceeds to block 908 where the management device prevents the operating system from utilizing those function subsystem(s). In an embodiment, at block 908 and in response to identifying function subsystem(s) in the BIOS inventory update that do not match function subsystem(s) identified in the untrusted function subsystem inventory, the function subsystem verification system 214 may provide that determination to the management engine 206*a*, and the management engine 206*a* may perform function subsystem utilization prevention operations in order to prevent the use of those function subsystem(s) by the operating system 210. For example, in some embodiments of block 908, the function subsystem(s) that are identified in the BIOS inventory update and not in the untrusted function subsystem inventory may introduce a severe enough security issue that the use the computing system 202 may be prevented in order to prevent the operating system 210 from utilizing those function subsystem(s).

Figure 13:
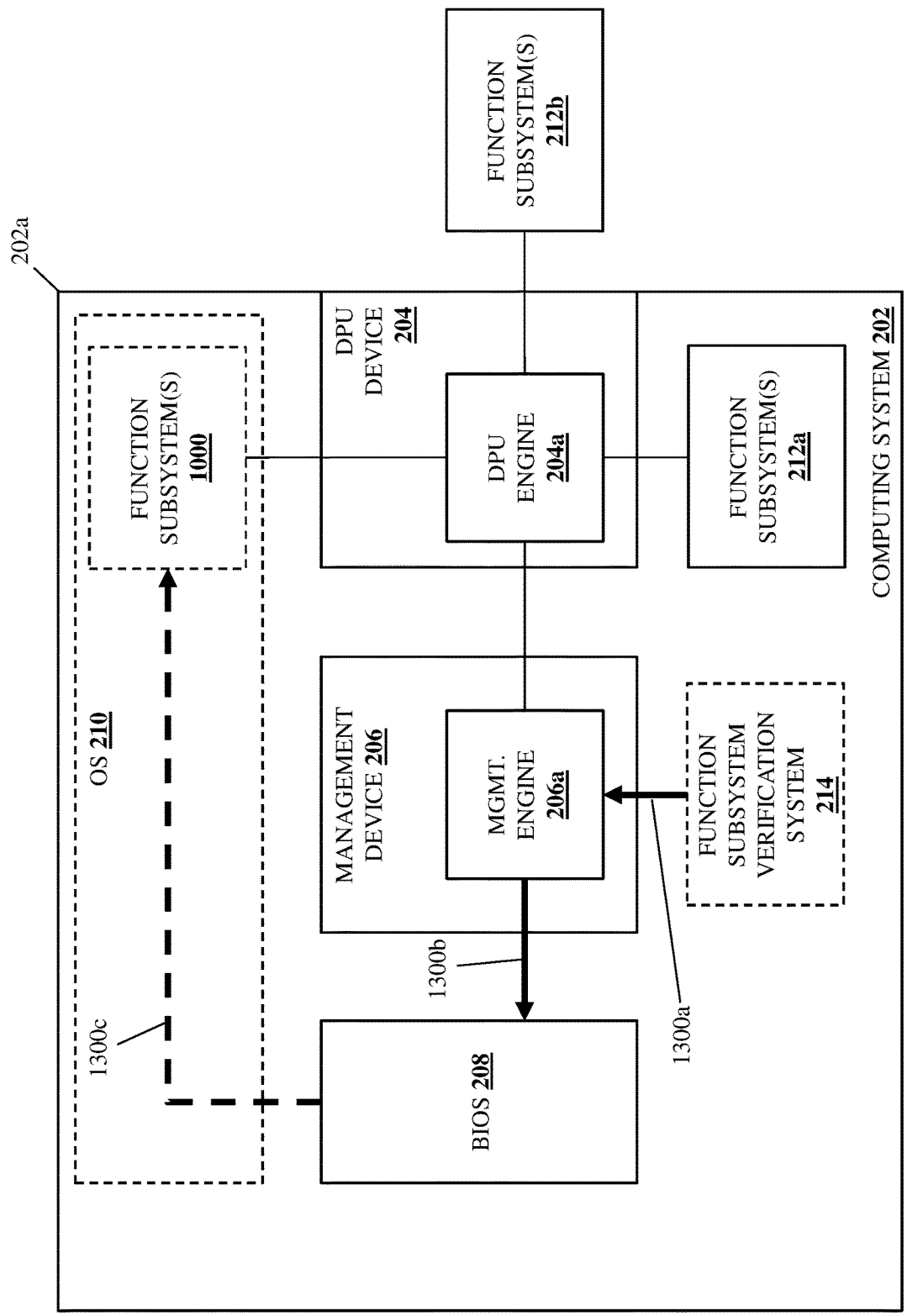
FIG. 13 is a schematic view illustrating an embodiment of the computing system of FIG. 2 operating during the method of FIG. 3.

With reference to FIG. 13, an embodiment of block 908 is illustrated in which the function subsystem(s) 1000 identified in the BIOS inventory update do not match the function subsystems identified in the untrusted function subsystem inventory and, in response, the function verification subsystem 214 performs function subsystem utilization prevention operations 1300*a* that may include providing a function subsystem utilization prevention instruction to the management engine 206*a* in the management device 206, and the management engine 206*a* performs function subsystem utilization prevention operations 1300*b* that may include providing a function subsystem utilization prevention instruction to the BIOS 208. In response to receiving the function subsystem utilization prevention instruction, the BIOS 208 may then perform function subsystem utilization prevention operations 1300*c* that may include preventing the utilization of the function subsystem(s) 1000 by the operating system 210, which is illustrated in FIG. 13 via the dashed lines for the function subsystem(s) 1000 in the operating system 210. For example, one of skill in the art in possession of the present disclosure will appreciate how the BIOS 208 may prevent the utilization of the function subsystem(s) 1000 by the operating system 210 by ensuring that the function subsystem(s) 1000 are not "visible" to the operating system 210, disabling the function subsystem(s) 1000, and/or performing any other BIOS operations that one of skill in the art in possession of the present disclosure would recognize as preventing function subsystem utilization by an operating system.

As such, the operating system 210 will be prevented from utilizing the function subsystem(s) 1000, which are presented to the operating system 210 by the DPU device 204 in a manner that would otherwise allow the operating system 210 to utilize those function subsystem(s) 1000 during runtime of the computing system 202, thus preventing those function subsystem(s) 1000 from being "provided" to that operating system 210. Furthermore, in the event the utilization of any of the function subsystem(s) 1000 by the operating system 210 cannot be prevented, the use of the computing system 202 may be prevented similarly as described above.

Similarly as discussed above, some embodiments of the method 300 may operate to prevent the use of any function subsystem that is configured for presentation to the operating system 210 on a DPU-enabled port on the DPU device 204 but not reported in an untrusted function subsystem inventory by the DPU device 204. However, as discussed above, some function subsystems may be accessible to the BIOS 208 and not the DPU device 204, and thus the provisioning of those function subsystems to the operating system 210 may be based on other factors (e.g., the license considerations described below) rather than their being reported in the untrusted function subsystem inventory discussed herein. Furthermore, as discussed above, some scenarios may include the DPU device presenting function subsystem(s) to the operating system that are not reported in an untrusted function subsystem inventory but that are licensed for use in the computing system and, in some embodiments, the determination of whether a license exists for a function system identified in a BIOS inventory may be the only factor utilized to determine whether the operating system is authorized to use that function subsystem.

If at decision block 906, it is determined that one or more function subsystems in the BIOS inventory update match the untrusted function subsystem inventory, the method 900 proceeds to decision block 910 where it is determined whether those function subsystem(s) are licensed. In an embodiment, at decision block 910 and following the performance of the function subsystem detection alert/BIOS inventory update match determination operations 1200 and a determination that the function subsystems identified in the BIOS inventory update match the function subsystems identified in the untrusted function subsystem inventory, the function subsystem verification system 214 may perform license determination operations that include determining whether a license exists for those function subsystems. As will be appreciated by one of skill in the art in possession of the present disclosure, a license for any function subsystem may be accessible to the function subsystem verification system 214 (e.g., securely stored in the management device 206, in a secure storage that is accessible via a network, etc.), and thus for any function subsystem that is identified in the function subsystem detection alert as well as in the BIOS inventory update, a determination may be made whether a license exists for that function subsystem.

Similarly as described above, the management device 206 (or a separate function subsystem verification system 214 that is accessible to the management device 206) may store a "licensing list" or other database of function subsystems that are licensed for use by the DPU device 204, and one of skill in the art in possession of the present disclosure will appreciate how such a database may store licensing files such as cryptographically signed and verifiable licenses for each function subsystem that is licensed for use by the DPU device 204. Furthermore, such a licensing list or database may be maintained by the management device 206 (or a separate function subsystem verification system 214 that is accessible to the management device 206), and may be static or configurable (e.g., modifiable) via a management device interface using techniques that would be apparent to one of skill in the art in possession of the present disclosure. Thus, an authorized entity may define the function subsystems available for presentation to the operating system 210 via the management device 206 and/or the function subsystem verification system 214.

If, at decision block 910, it is determined that the function subsystem(s) are not licensed, the method 900 proceeds to block 908 where the management device prevents the operating system from utilizing those function subsystem(s). In an embodiment, at block 908 and in response to determining that a license does not exist for a function subsystem that is identified in the BIOS inventory update as well as in the untrusted function subsystem inventory, the method 900 may proceed to block 908 and operate substantially as described above to prevent the operating system 210 from utilizing any function subsystem for which a license does not exist.

If, at decision block 910, it is determined that the function subsystem(s) are licensed, the method 900 proceeds to block 912 where the management device allows the operating system to use those function subsystem(s). In an embodiment, at block 912 and in response to determining that a license exists for a function subsystem that is identified in the BIOS inventory update as well as in the untrusted function subsystem inventory, the management engine 206a in the management device 206 may perform function subsystem utilization allowance operations in order to allow the use of those function subsystem(s) by the operating system 210.

Figure 14:
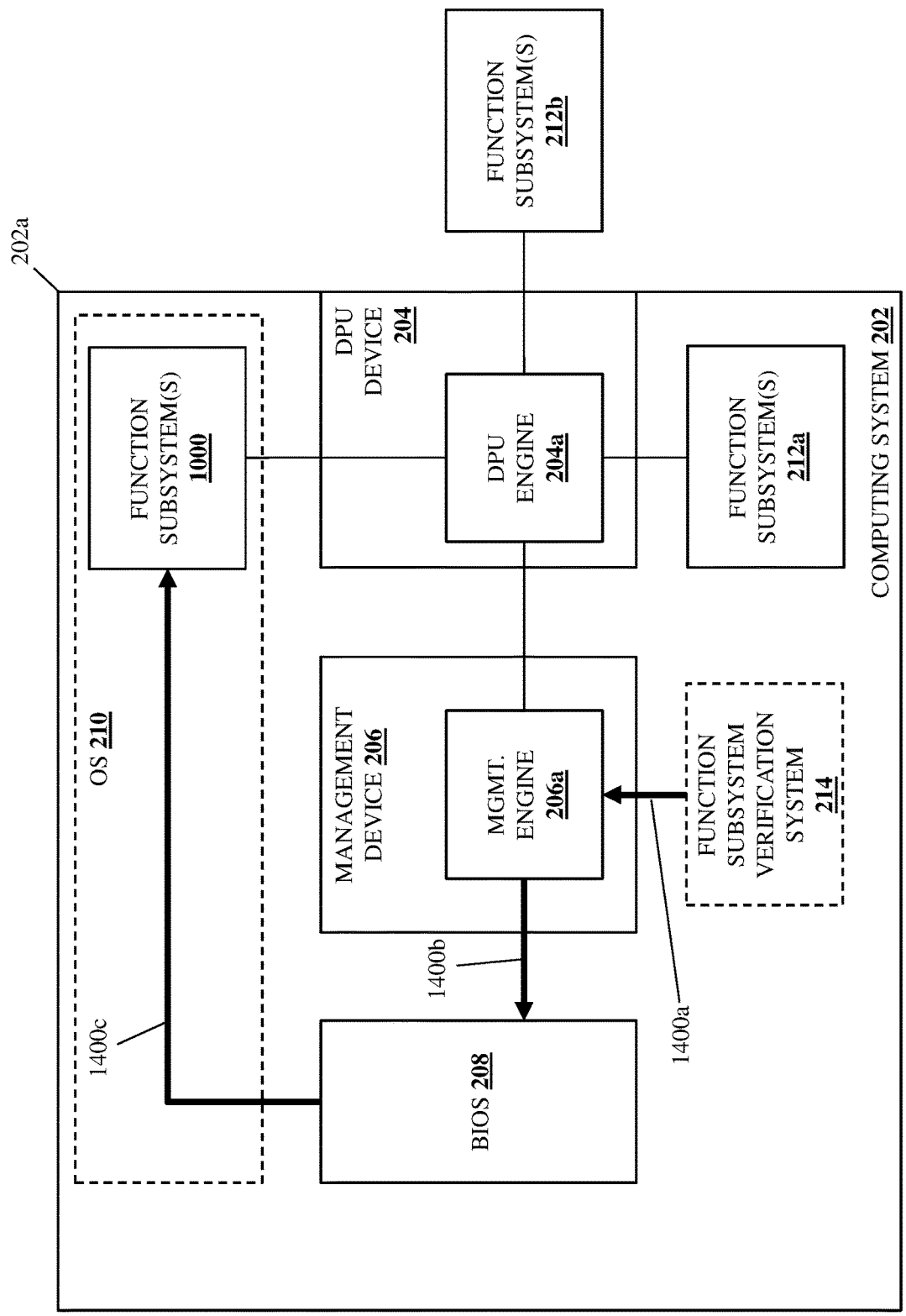
FIG. 14 is a schematic view illustrating an embodiment of the computing system of FIG. 2 operating during the method of FIG. 3.

With reference to FIG. 14, an embodiment of block 912 is illustrated in which the function subsystem(s) 1000 identified in the BIOS inventory update match the function subsystems identified in the untrusted function subsystem inventory, and a determination is made that licenses exist for the function subsystem(s) 1000. In response, the function subsystem verification system 214 performs function subsystem utilization allowance operations 1400a that may include providing a function subsystem utilization allowance instruction to the management engine 206a in the management device 206, and the management engine 206a performs function subsystem utilization prevention operations 1400b that may include providing a function subsystem utilization allowance instruction to the BIOS 208. In response to receiving the function subsystem utilization allowance instruction, the BIOS 208 may perform function subsystem allowance operations 1400c that include allowing the utilization of the function subsystem(s) 1000 by the operating system 210, which is illustrated in FIG. 14 by the solid lines provided for the function subsystem(s) 1000 included in the operating system 210. For example, one of skill in the art in possession of the present disclosure will appreciate how the BIOS 208 may allow the utilization of the function subsystem(s) 1000 by the operating system 210 by ensuring that the function subsystem(s) are "visible" to the operating system 210, ensuring the function subsystem (s) 1000 are enabled, and/or performing any other BIOS operations one of skill in the art in possession of the present disclosure would recognize as allowing function subsystem utilization by an operating system.

As discussed above, the function subsystem utilization allowance operations "performed" by the BIOS 208 may require no action being performed by the BIOS 208, with the BIOS 208 defaulting to allowing the utilization of the function subsystem(s) by the operating system 210. However, one of skill in the art in possession of the present disclosure will appreciate how the function subsystem utilization allowance operations may be performed by the BIOS 208 similar to the function subsystem utilization prevention instructions described in the examples above (and in some cases with the BIOS 208 instead defaulting to preventing the utilization of the function subsystem(s) by the operating system 210).

Thus, systems and methods have been described that provide for the inventorying and verification of function subsystems presented to an operating system during runtime by an untrusted orchestrator device. For example, the untrusted orchestrator function subsystem inventory and verification system of the present disclosure may include an untrusted orchestrator device, an operating system, a BIOS, and a management device. In response to presentation by the untrusted orchestrator device of a function subsystem to the operating system during runtime, the operating system generates a function subsystem detection alert that identifies the function subsystem. In response to the function subsystem detection alert, the BIOS generates and transmits a BIOS inventory update that identifies the function subsystem. The management device receives the BIOS inventory update, and determines whether the operating system is authorized to use the function subsystem at least in part based on the BIOS inventory update. If so, the management device allows the operating system to utilize the function subsystem while, if not, the management device prevents the operating system from utilizing the function subsystem. As such, function subsystems presented to an operating system during runtime by an untrusted orchestrator device may be inventoried and verified before being provided to that operating system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An untrusted orchestrator function subsystem inventory and verification system, comprising:
   an untrusted orchestrator device that includes at least one untrusted orchestrator device processor that is configured to generate and transmit an untrusted function subsystem inventory that identifies at least one function subsystem that is configured for presentation via the untrusted orchestrator device to an operating system;
   the operating system that is coupled to the untrusted orchestrator device and that is configured, in response to presentation by the untrusted orchestrator device of a first function subsystem to the operating system during runtime, to generate and transmit a first function subsystem detection alert that identifies the first function subsystem;
   a Basic Input/Output System (BIOS) that is coupled to the operating system and that is configured to receive the first function subsystem detection alert and, in response, generate and transmit a first BIOS inventory update that identifies at least one function subsystem that is accessible to the BIOS and that is presented to the operating system during runtime of the operating system;
   a management device that includes at least one management device processor that is coupled to the BIOS and the untrusted orchestrator device, and that is configured to:
      receive the untrusted function subsystem inventory from the untrusted orchestrator device;
      receive the first BIOS inventory update from the BIOS;
      determine that the first function subsystem is identified in the first BIOS inventory update and is identified in the untrusted function subsystem inventory; and
      allow, in response to determining that the first function subsystem is identified in the first BIOS inventory update and is identified in the untrusted function subsystem inventory,
the operating system to utilize the first function subsystem.

2. The system of claim 1, wherein the at least one management device processor is configured to implement a function subsystem verification system that is configured to determine that the first function subsystem is identified in the first BIOS inventory update and is identified in the untrusted function subsystem inventory.

3. The system of claim 1, wherein the management device is coupled to a function subsystem verification system via a network, and wherein the at least one management device processor in the management device is configured to determine that the first function subsystem is identified in the first BIOS inventory update and is identified in the untrusted function subsystem inventory by:
   forwarding the first BIOS inventory update to the function subsystem verification system via the network; and
   receiving, from the function subsystem verification system via the network, the determination that the first function subsystem is identified in the first BIOS inventory update and is identified in the untrusted function subsystem inventory.

4. The system of claim 1, wherein the operating system is configured to detect the presentation of the first function subsystem to the operating system during runtime via detection of a hot-plug event associated with the first function subsystem.

5. The system of claim 1, wherein the BIOS is configured, during initialization operations that are prior to the runtime, to generate a BIOS inventory that identifies at least one function subsystem that is accessible to the BIOS and that is configured for presentation to the operating system during runtime of the operating system, and transmit the BIOS inventory to the management device.

6. The system of claim 1, wherein the operating system is configured, in response to presentation by the untrusted orchestrator device of a second function subsystem to the operating system during runtime, to generate and transmit a second function subsystem detection alert that identifies the second function subsystem;
   wherein the BIOS is configured to receive the second function subsystem detection alert and, in response, generate and transmit a second BIOS inventory update that identifies at least one additional function subsystem that is accessible to the BIOS and that is presented to the operating system during runtime of the operating system; and
   wherein the at least one management device processor in the management device is configured to:
   receive the second BIOS inventory update from the BIOS;
   determine that the second function subsystem is identified in the second BIOS inventory update and is not identified in the untrusted function subsystem inventory; and
   prevent, in response to determining that the second function subsystem is identified in the second BIOS inventory update and is not identified in the untrusted function subsystem inventory, the operating system from utilizing the second function subsystem.

7. An Information Handling System (IHS), comprising:
   an Information Handling System (IHS) chassis;
   an untrusted orchestrator device that is included in the IHS chassis and that includes at least one untrusted orchestrator device processor that is configured to generate and transmit an untrusted function subsystem inventory that identifies at least one function subsystem that is configured for presentation via the untrusted orchestrator device to an operating system;
a processing system that is included in the IHS chassis;
a memory system that is included in the IHS chassis, that is coupled to the processing system, and that includes instructions that, when executed by the processing system, cause the processing system to provide the operating system that is configured, in response to presentation by the untrusted orchestrator device of a first function subsystem to the operating system during runtime, to generates and transmit a first function subsystem detection alert that identifies the first function subsystem;
a Basic Input/Output System (BIOS) that is included in the IHS chassis, that is coupled to the processing system, and that is configured to receive the first function subsystem detection alert and, in response, generate and transmit a first BIOS inventory update that identifies at least one function subsystem that is accessible to the BIOS and that is presented to the operating system during runtime of the operating system;
a management device that is included in the IHS chassis, that is coupled to the BIOS and the untrusted orchestrator device, and that includes at least one management device processor that is configured to:
receive the untrusted function subsystem inventory from the untrusted orchestrator device;
receive the first BIOS inventory update from the BIOS;;
determine that the first function subsystem is identified in the first BIOS inventory update and is identified in the untrusted function subsystem inventory; and
allow, in response to determining that the first function subsystem is identified in the first BIOS inventory update and is identified in the untrusted function subsystem inventory;
the operating system to utilize the first function subsystem.

8. The IHS of claim 7, wherein the at least one management device processor is configured to implement a function subsystem verification system that is configured to determine that the first function subsystem is identified in the first BIOS inventory update and is identified in the untrusted function subsystem inventory.

9. The IHS of claim 7, wherein the management device is coupled to a function subsystem verification system via a network, and wherein the at least one management device processor in the management device is configured to determine that the first function subsystem is identified in-the first BIOS inventory update and is identified in the untrusted function subsystem inventory by:
forwarding the first BIOS inventory update to the function subsystem verification system via the network; and
receiving, from the function subsystem verification system via the network, the determination that the first function subsystem is identified in-the first BIOS inventory update and is identified in the untrusted function subsystem inventory.

10. The IHS of claim 7, wherein the operating system is configured to detect the presentation of the first function subsystem to the operating system during runtime via detection of a hot-plug event associated with the first function subsystem.

11. The IHS of claim 7, wherein the BIOS is configured, during initialization operations that are prior to the runtime, to generate a BIOS inventory that identifies at least one function subsystem that is accessible to the BIOS and that is configured for presentation to the operating system during runtime of the operating system, and transmit the BIOS inventory to the management device.

12. The IHS of claim 7, wherein the operating system is configured, in response to presentation by the untrusted orchestrator device of a second function subsystem to the operating system during runtime, to generate and transmit a second function subsystem detection alert that identifies the second function subsystem;
wherein the BIOS is configured to receive the second function subsystem detection alert and, in response, generate and transmit a second BIOS inventory update that identifies at least one additional function subsystem that is accessible to the BIOS and that is presented to the operating system during runtime of the operating system; and
wherein the at least one management device processor in the management device is configured to:
receive the second BIOS inventory update from the BIOS;
determine that the second function subsystem is identified in the second BIOS inventory update and is not identified in the untrusted function subsystem inventory; and
prevent, in response to determining that the second function subsystem is identified in the second BIOS inventory update and is not identified in the untrusted function subsystem inventory, the operating system from utilizing the second function subsystem.

13. The IHS of claim 7, wherein the allowing the operating system to use the first function subsystem is performed in response to determining that the first function subsystem is identified in the first BIOS inventory update and is identified in the untrusted function subsystem inventory, and determining that a license exists for the first function subsystem.

14. A method for inventorying and verifying function subsystems presented to an operating system by an untrusted orchestrator device, comprising:
generating and transmitting, by an untrusted orchestrator device using at least one untrusted orchestrator device processor, an untrusted function subsystem inventory that identifies at least one function subsystem that is configured for presentation via the untrusted orchestrator device to an operating system;
generating and transmitting, by the operating system in response to presentation by the untrusted orchestrator device of a first function subsystem to the operating system during runtime, a first function subsystem detection alert that identifies the first function subsystem;
receiving, by a Basic Input/Output System (BIOS), the first function subsystem detection alert;
generating and transmitting, by the BIOS in response to receiving the first function subsystem detection alert, a first BIOS inventory update that identifies at least one function subsystem that is accessible to the BIOS and that is presented to the operating system during runtime of the operating system;
receiving, by a management device using at least one management device processor, the untrusted function subsystem inventory and the first BIOS inventory update;
determining, by the management device using the at least one management device processor, that the first function subsystem is identified in the first BIOS inventory update and is identified in the untrusted function subsystem inventory; and allowing, by the management device using the at least one management device processor in response to determining that the first function subsystem is identified in the first BIOS inventory update and is identified in the untrusted function subsystem inventory, the operating system to utilize the first function subsystem.

15. The method of claim 14, wherein the at least one management device processor implements a function subsystem verification system and the method includes:

determining, by the function subsystem verification system, that the first function subsystem is identified in the first BIOS inventory update and is identified in the untrusted function subsystem inventory.

16. The method of claim 14, wherein the management device is coupled to a function subsystem verification system via a network, and wherein the determining that the first function subsystem is identified in the first BIOS inventory update and is identified in the untrusted function subsystem inventory includes:

forwarding, by the management device using the at least one management device processor, the first BIOS inventory update to the function subsystem verification system via the network; and receiving, by the management device using the at least one management device processor from the function subsystem verification system via the network, the determination that the first function subsystem is identified in the first BIOS inventory update and is identified in the untrusted function subsystem inventory.

17. The method of claim 14, further comprising:

detecting, by the operating system, the presentation of the first function subsystem to the operating system during runtime via detection of a hot-plug event associated with the first function subsystem.

18. The method of claim 14, further comprising:

generating, by the BIOS during initialization operations that are prior to the runtime, a BIOS inventory that identifies at least one function subsystem that is accessible to the BIOS and that is configured for presentation to the operating system during runtime of the operating system; and transmitting, by the BIOS using the at least one BIOS processor, the BIOS inventory to the management device.

19. The method of claim 14, further comprising:

generating and transmitting, by the operating system in response to presentation by the untrusted orchestrator device of a second function subsystem to the operating system during runtime, a second function subsystem detection alert that identifies the second function subsystem;

receiving, by the BIOS, the second function subsystem detection alert;

generating and transmitting, by the BIOS in response to receiving the second function subsystem detection alert, a second BIOS inventory update that identifies at least one additional function subsystem that is accessible to the BIOS and that is presented to the operating system during runtime of the operating system;

receiving, by the management device using the at least one management device processor, the second BIOS inventory update;

determining, by the management device using the at least one management device processor, that the second function subsystem is identified in the second BIOS inventory update and is not identified in the untrusted function subsystem inventory; and preventing, by the management device using the at least one management device processor in response to determining that the second function subsystem is identified in the second BIOS inventory update and is not identified in the untrusted function subsystem inventory, the operating system from utilizing the second function subsystem.

20. The method of claim 14, wherein the allowing the operating system to use the first function subsystem is performed in response to determining that the first function subsystem is identified in the first BIOS inventory update and is identified in the untrusted function subsystem inventory, and determining that a license exists for the first function subsystem.

* * * * *